United States Patent
Fishman et al.

(10) Patent No.: US 12,393,005 B2
(45) Date of Patent: Aug. 19, 2025

(54) NONDEGENERATE TWO-PHOTON ABSORPTION IN SILICON-BASED CAMERAS

(71) Applicant: THE REGENTS OF THE UNIVERSITY OF CALIFORNIA, Oakland, CA (US)

(72) Inventors: Dmitry A. Fishman, Aliso Viejo, CA (US); Eric O. Potma, Irvine, CA (US); David Knez, Long Beach, CA (US)

(73) Assignee: The Regents of the University of California, Oakland, CA (US)

( * ) Notice: Subject to any disclaimer, the term of this patent is extended or adjusted under 35 U.S.C. 154(b) by 410 days.

(21) Appl. No.: 17/914,678

(22) PCT Filed: Mar. 24, 2021

(86) PCT No.: PCT/US2021/023973
§ 371 (c)(1),
(2) Date: Sep. 26, 2022

(87) PCT Pub. No.: WO2021/195273
PCT Pub. Date: Sep. 30, 2021

(65) Prior Publication Data
US 2023/0119953 A1  Apr. 20, 2023

Related U.S. Application Data

(60) Provisional application No. 62/993,906, filed on Mar. 24, 2020.

(51) Int. Cl.
*G02B 21/00* (2006.01)
*G02B 21/36* (2006.01)

(52) U.S. Cl.
CPC ....... *G02B 21/0064* (2013.01); *G02B 21/361* (2013.01); *G02B 21/367* (2013.01); *G02B 21/368* (2013.01)

(58) Field of Classification Search
CPC .................. G02B 21/0064; G02B 21/361; G02B 21/367; G02B 21/368; G01J 3/2803;
(Continued)

(56) References Cited

U.S. PATENT DOCUMENTS 8,013,305 B2 * 9/2011 Martini .................. H04N 23/20
250/353
2004/0258935 A1 * 12/2004 Kono ................ G11B 11/10506
(Continued)

*Primary Examiner* — Kiho Kim
(74) *Attorney, Agent, or Firm* — Brooks Kushman P.C.

(57) ABSTRACT

A method for infrared chemical imaging through nondegenerate two-photon absorption includes a step of providing pulsed or continuous wave radiation having pumping photons at near-infrared wavelength and providing pulsed or continuous wave radiation that having mid-infrared photons at a mid-infrared wavelength with peak intensities less than 50 W/cm². The mid-infrared photons are directed onto a target sample. The method also includes a step of spatially and temporally overlapping the mid-infrared photons with the pumping photons. The mid-infrared photons and the pumping photons are directed onto a camera having an array or matrix of imaging devices. Characteristically, the sum of photon energy for each temporally and spatially overlapping mid-infrared photons and pumping photons is greater than or equal to the bandgap energy.

36 Claims, 24 Drawing Sheets

(58) Field of Classification Search
CPC ...... G01J 3/2823; G01J 3/42; G01J 2003/102; G01J 3/10; G01N 21/3563; G01N 21/4795
See application file for complete search history.

(56) References Cited

U.S. PATENT DOCUMENTS

2018/0246032 A1* 8/2018 Li .................. G01N 21/171
2019/0120753 A1* 4/2019 Prater .............. G01N 21/59

* cited by examiner

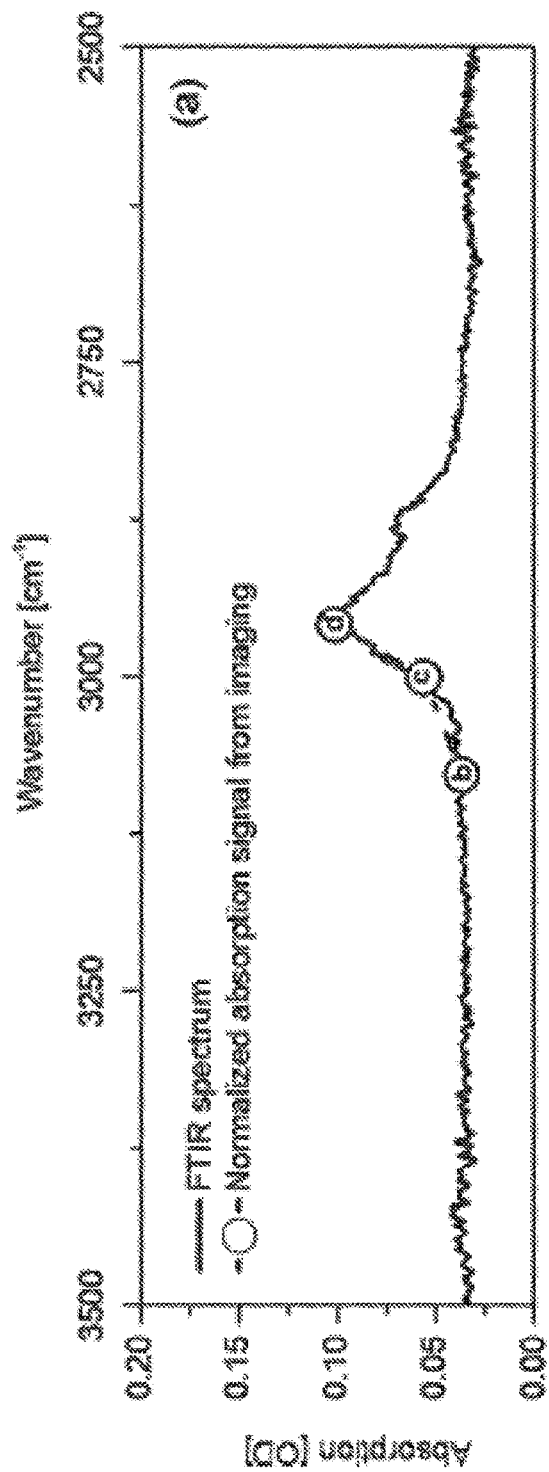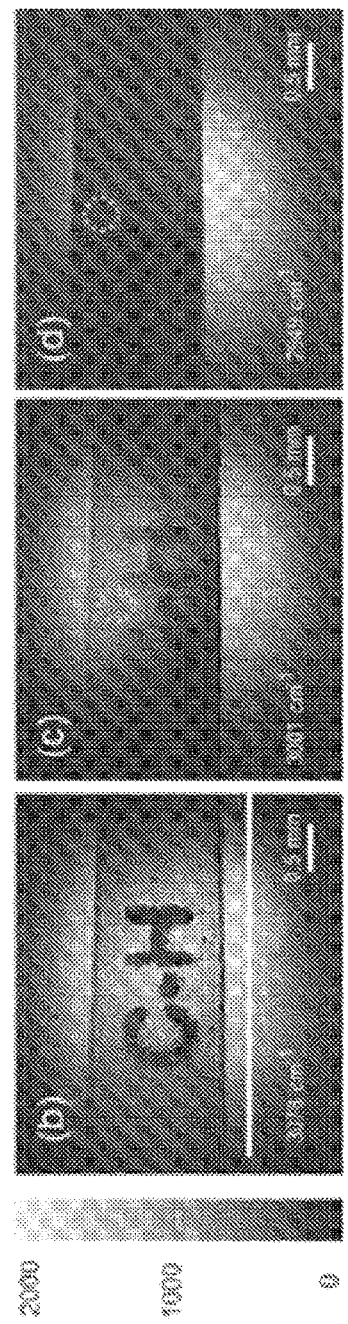
Fig. 7A  Fig. 7B  Fig. 7C  Fig. 7D

NONDEGENERATE TWO-PHOTON ABSORPTION IN SILICON-BASED CAMERAS

CROSS-REFERENCE TO RELATED APPLICATIONS

This application claims the benefit of U.S. provisional application Ser. No. 62/993,906 filed Mar. 24, 2020, the disclosure of which is hereby incorporated in its entirety by reference herein.

TECHNICAL FIELD

In at least one aspect, the present invention is related to infrared imaging of a target sample.

BACKGROUND

Many fundamental molecular vibrations have energies in the mid-infrared (MIR) window—a wavelength region that stretches from 2 μm to about 10 μm. For this reason, the MIR range is of particular interest for spectroscopic imaging. The ability to generate images with chemical selectivity is of direct relevance to a myriad of fields, driving the implementation of MIR-based imaging for biomedical mapping of tissues [1-3], inspection of industrial ceramics [4], stand-off detection of many materials such as explosives, narcotics, plastics, blended polymers to name a few [5], mineral sensing [6, 7], and environmental monitoring [8], among others. In addition, when combined with interferometric gating, MIR light has proven attractive for tomographic imaging, allowing the visualization and three-dimensional reconstruction of a variety of structured materials. In particular, compared to visible and near-IR (NIR) radiation, MIR light has a much higher penetration depth in highly scattering materials such as ceramics, paints, and printed electronics, which has prompted the development of MIR-based optical coherence tomography (MIR-OCT) techniques. [9-17].

Given its unique analytical capabilities, it is perhaps surprising that MIR-based imaging is not a more widely adopted technology for chemical mapping. The relatively scarce implementation of MIR imaging has been due to the lack of bright and affordable light sources in this range, although recent developments in MIR light source technology have largely overcome this problem. [18-20] Nonetheless, a remaining limitation is the performance and high cost of MIR cameras. Current cameras are based on low bandgap materials, such as HgCdTe (MCT) or InSb, which inherently suffer from thermally excited electronic noise. [21] Cryogenic cooling helps to suppress this noise but it renders the MIR camera a much less practical and affordable detector compared to mature Si-based detectors for the visible and near-IR.

Recognizing the attractive features of Si-based cameras, several strategies have been developed that aim to convert information from the MIR into the visible/NIR range, thus making it possible to indirectly capture MIR signatures with a Si detector. A very recent development is the use of an entangled MIR/vis photon pair, which allows MIR ghost imaging through detecting visible photons on a Si-based camera. [22] Another strategy accomplishes the MIR-to-visible conversion by using a nonlinear optical (NLO) response of the sample. Photothermal imaging, which probes the MIR-induced changes in the sample with a visible secondary beam, is an example of this approach. [23-27] Yet another technique uses a nonlinear optical crystal placed after the sample to up-convert MIR radiation with an additional pump beam through the process of sum-frequency generation (SFG). [28-34] The visible/NIR radiation produced can be efficiently registered with a high bandgap semiconductor detector. Elegant video-rate MIR up-conversion imaging has recently been accomplished with a Si-based camera at room temperature, offering an attractive alternative to imaging with MCT focal plane arrays. [35] A possible downside of SFG up-conversion techniques is the requirement of phase-matching of the MIR radiation with the pump beam in the NLO medium. This implies crystal rotation to enable the multiple projections needed for capturing a single image and post-processing for each measured frame for image reconstruction.

An alternative to utilizing the optical nonlinearity of the sample or a dedicated conversion crystal for indirect MIR detection is the use of the NLO properties of the detector itself. In particular, the process of nondegenerate two-photon absorption (NTA) in wide bandgap semiconductor materials has been shown to permit detection of MIR radiation at room temperature with the help of an additional visible or NIR probe beam. [36-39] In NTA, the signal scales linearly with the MIR intensity with detection sensitivities that rival that of cooled MCT detectors. [36] Compared to SFG-based up-conversion, NTA does not depend on phase-matching and avoids the need for an NLO crystal altogether, offering a much simpler detection strategy. Moreover, the nonlinear absorption coefficient drastically increases with the energy ratio of the interacting photons [40-44], allowing detection over multiple spectral octaves. Although NTA has been shown to enable efficient MIR detection with single-pixel detectors, its advantages have not yet been translated to imaging with efficient Si-based cameras.

The nature of nonlinear absorption enhancement for direct-band semiconductors has been extensively studied and modeled with allowed-forbidden transitions between two parabolic bands. [42-45] The nonlinear absorption coefficient $\alpha_2$ for photon energies $\hbar\omega_{pump}$ and $\hbar\omega_{MIR}$ can be written as [45]:

$$\alpha_2(\omega_p, \omega_{MIR}) = K \frac{\sqrt{E_p}}{n_p n_{MIR} E_q^3} F(x_p, x_{MIR}) \tag{1}$$

$$F = \frac{(x_p + x_{MIR} - 1)^{3/2}}{2^7 x_p (x_{MIR})^2} \left(\frac{1}{x_p} + \frac{1}{x_{MIR}}\right)^2, \; x_p = \frac{\hbar\omega_p}{E_g}, \; x_{MIR} = \frac{\hbar\omega_{MIR}}{E_g}$$

where $E_p$ is the Kane energy parameter, $n_p$ and $n_{MIR}$ are refractive indices, and K is a material-independent constant. The function F accounts for the change in nonlinear absorption as the ratio between the pump and MIR photon energies is adjusted, with dramatic enhancements when the pump energy is tuned closer to the bandgap energy $E_g$. For an indirect bandgap semiconductor like Si, optical transitions can be understood as a nonlinear process that involves three interacting particles—two photons and a phonon. Several models have been considered to describe multiphoton absorption in Si, including earlier "forbidden-forbidden" models [46], and more the recently suggested "allowed-forbidden" and "allowed-allowed" pathways [47]. The latter two models agree well with degenerate absorption experiments [48]. For the case of NTA, experiments demonstrate enhancement behavior similar to those seen in direct-bandgap semiconductors [49-50], with the "allowed-allowed" pathways providing the best description [51]. Modest numbers of the acquired and derived nonlinear absorption coefficients of only a few cm/GW rendered Si as a rather inefficient material for NTA. For this reason, attempts to develop MIR detection strategies based on Si detectors have been scarce.

Although the unique imaging capabilities of MIR tomographic imaging, and MIR-OCT in particular, address an important need in the characterization of structured materials, its practical implementation is hampered by technical hurdles. For instance, fast and low-noise detection of MIR radiation, a prerequisite for rapid imaging, remains a challenge for existing detector technologies. MIR detectors, such as those based on low bandgap materials like InSb and HgCdTe, suffer from a high thermal background. Moreover, MIR detector arrays typically have fewer elements compared to their visible/NIR counterparts, thus limiting high-definition imaging capabilities. These obstacles have spurred many developments that aim to convert the information encoded in MIR light into vis/NIR radiation. [13-18]. [26, 40, 41, 30, 52, 53] Such spectral conversion enables the use of mature detector technology based on Si or other wide bandgap semiconductor materials. [19-25] [34, 36, 28, 35, 54-56] This strategy has been leveraged to improve the performance of MIR OCT, using either nonlinear up-conversion [26] [57] or nonlinear interferometry with entangled photons. [27-31] [58-62] MIR tomographic images have been recorded at sub-10 μm axial resolution and total acquisition times of minutes per volume.

Nondegenerate two-photon absorption (NTA) in a wide bandgap semiconducting photodetector has been discussed in depth [15, 20, 32-35]. [38, 36, 41, 42, 48, 51, 63,] In fact, the principle of NTA has recently been used to acquire tomographic images in the MIRrange with the aid of a single pixel GaN photodiode.[36] To achieve 3D imaging, the object was raster scanned across a focused MIR beam, requiring multiple minutes to build up a volumetric dataset when using lock-in detection.

Despite these important advances in MIR-OCT, the total acquisition time for volumetric images is still rather long and relies on lateral raster scanning of the beam, rendering current approaches less practical for time-sensitive applications. Furthermore, signal levels appear insufficient for examining weakly reflective interfaces of organic materials nor do current OCT applications take clear advantage of the spectroscopic sensitivity afforded by MIR light.

Although chemical imaging based on mid-infrared (MIR) spectroscopic contrast is an important technique with a myriad of applications, current MIR cameras exhibit a lack in performance and are much less affordable compared to mature Si-based devices, which operate in the visible and near-infrared.

Accordingly, there is a need for improved imaging techniques using infrared radiation.

SUMMARY

In at least one aspect, systems and methods for infrared chemical imaging through nondegenerate two-photon absorption are provided. The methods include a step of providing pulsed or continuous wave radiation having pumping photon pulses at near-infrared wavelengths and providing pulsed or continuous wave radiation at a mid-infrared wavelength optionally having peak intensities less than 50 W/cm$^2$. The mid-infrared photons are directed onto a target sample. The method also includes a step of spatially and temporally overlapping the mid-infrared photons with the pumping photons. The mid-infrared photons and the pumping photons are directed onto a camera having an array or matrix of imaging elements. Each imaging element includes a semiconductor having a direct or indirect bandgap energy. Characteristically, the sum of photon energy for each temporally and spatially overlapping mid-infrared photon and pumping photon is greater than or equal to the direct or indirect bandgap energy.

In another aspect, an imaging system using nondegenerate two-photon absorption is provided. The imaging system includes a sample holder for positioning a target sample to be imaged. The imaging system includes a camera having an array or matrix of imaging elements. Each imaging element includes a semiconductor having a direct or indirect bandgap energy. The camera is configured to provide image data to a device for displaying an image of the target sample. The imaging system also includes a first photon source of pulsed or continuous wave radiation that provides pumping photons at a near-infrared wavelength. The imaging system also includes an imaging component for directing the mid-infrared photons from the target sample to the camera. A second photon source of pulsed or continuous wave radiation provides mid-infrared photons at a mid-infrared wavelength optionally having peak intensities less than 50 W/cm$^2$. A first optical system directs the mid-infrared photons onto the target sample. Similarly, a second optical system directs the pumping photons on a path that ultimately leads to an imaging element. Advantageously, the mid-infrared photons and the pumping photons are directed onto the array or matrix of imaging elements such that the mid-infrared photons and the pumping photons are spatially and temporally overlapping on each imaging element of the array or matrix. Characteristically, the sum of photon energy for each temporally and spatially overlapping mid-infrared photon and pumping photon is greater than or equal to the direct or indirect bandgap energy.

In another aspect, a 3D imaging system using nondegenerate two-photon absorption is provided. The imaging system includes a sample holder for positioning a target sample to be imaged. The system also includes a camera having an array or matrix of imaging elements where each imaging element includes a semiconductor having a direct or indirect bandgap energy. The camera is configured to provide image data to a device for displaying an image of the target sample. The imaging system also includes a first photon source of pulsed or continuous wave radiation that provides pumping photons at a near-infrared wavelength and a second photon source of pulsed or continuous wave radiation that provides mid-infrared photons at a mid-infrared wavelength optionally having a peak intensities less than 50 W/cm$^2$. A first optical system directs the mid-infrared photons onto the target sample. The imaging system also includes an imaging component for directing the mid-infrared photons from the target sample to the camera. The sample holder positions the target sample such that the mid-infrared photons reflect or scatter off the target sample. A second optical system directs the pumping photon pulses on a path that ultimately leads to an imaging element. An optional photon delay line adjusts a time delay between the pumping photons and the mid-infrared photons, allowing the time delay to be scanned, thereby allowing imaging of slices in the target sample. Advantageously, the mid-infrared photons and the pumping photons are directed onto the array or matrix of imaging elements such that the mid-infrared photons and the pumping photons are spatially and temporally overlapping on each imaging element of the array or matrix. Characteristically, the sum of photon energy for each temporally and spatially overlapping mid-infrared photon and pumping photon is greater than or equal to the direct or indirect bandgap energy.

In another aspect, fast MIR chemical imaging through nondegenerate two-photon absorption (NTA) in a standard Si-based charge-coupled device (CCD) is provided. It is shown that wide-field MIR images can be obtained at 100 ms exposure times using picosecond pulse energies of only a few fJ per pixel through NTA directly on the CCD chip. Because this on-chip approach does not rely on phase-matching, it is alignment-free and does not necessitate complex post-processing of the images. The utility of this technique is applicable to chemically selective MIR imaging of polymers and biological samples, including MIR videos of moving targets, physical processes and live nematodes.

In another aspect, infrared chemical imaging is applied a massively parallel fashion through the use of an imaging device having an array of elements (e.g., a 1.4 Mpx Si CCD camera), thereby omitting the need for lateral scanning altogether and enabling the acquisition of 3D images in mere seconds or faster. Advantageously, acquisition rates that are up to two orders of magnitude higher than the present standard are achieved. This novel detection strategy permits 3D MIR imaging at high sensitivity. Moreover, NTA-enabled tomography allows background-free 3D MIR imaging of weakly reflective interfaces of organic materials, objects underneath a MID-IR transparent material and even targets hidden underwater, using MIR illumination doses as low as 0.4 mW/cm$^2$.

In another aspect, the chemical selectivity of MIR tomography is demonstrated. In this regard, 3D images of polymer structures and protein crystals with spectroscopic contrast based on fundamental vibrational transitions in the 2000-3000 cm$^{-1}$ range are acquired.

In another aspect, a new, high-speed 3D imaging technique that overcomes the shortcomings in MIR tomographic imaging is provided. Instead of relying on interferometric gating to achieve depth resolution, the approach uses a nonlinear optical gate provided by an additional femto second pulse through the process of nondegenerate two-photon absorption (NTA) in a wide bandgap semiconducting photodetector.

Advantageously, the methods and systems set forth herein can be used for biomedical mapping of tissues, inspection of industrial ceramics, stand-off detection of many materials such as explosives, narcotics, plastics, blended polymers etc., mineral sensing, and environmental monitoring. The imaging system and method can also be used to inspect electronic circuits.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIG. 3A: Linear, nondegenerate and degenerate response of the Si photodiode. Inset: proposed scheme of photon absorption in Si. FIG. 3B: Full dynamic range for MIR detection with a detection floor of 200 fJ picosecond pulse energy for the given detector parameters.

FIGS. 6A, 6B-1, and 6B-2. (A) Image of MIR (3394 nm) beam profile using a 1478 nm pump pulse. (B-1) Image of razor blade covering half of MIR. The cross-section is shown at the top of the panel. (B-2) Error function analysis shows that the resolution is about 15 pixels (~100 μm) under the current conditions.

FIGS. 7A, 7B, 7C, and 7D. Spectral imaging of a 150 μm thick cellulose acetate film. The printed letters serve as a mask that blocks broadband radiation. (A) FTIR transmission spectrum. MIR image taken at (B) off-resonance energy, (C) the high energy side of the absorption maximum, and (D) the absorption maximum.

FIGS. 8A-1, 8A-2, 8A-3, 8B-1, 8B-2, 8B-3, 8C-1, 8C-2, and 8C-3. MIR images of various materials accompanied. Left column shows off-resonance MIR images, whereas the middle column shows MIR images taken at an energy that corresponds with a designated absorptive line. The right column displays the FTIR absorption spectra of the sample with on, and off-resonance frequencies indicated. (A) Interface between $D_2O$ and silicone lubricant. (B) APPPO polymer film. (C) Wing of a common bee.

DETAILED DESCRIPTION

Figure 1A:
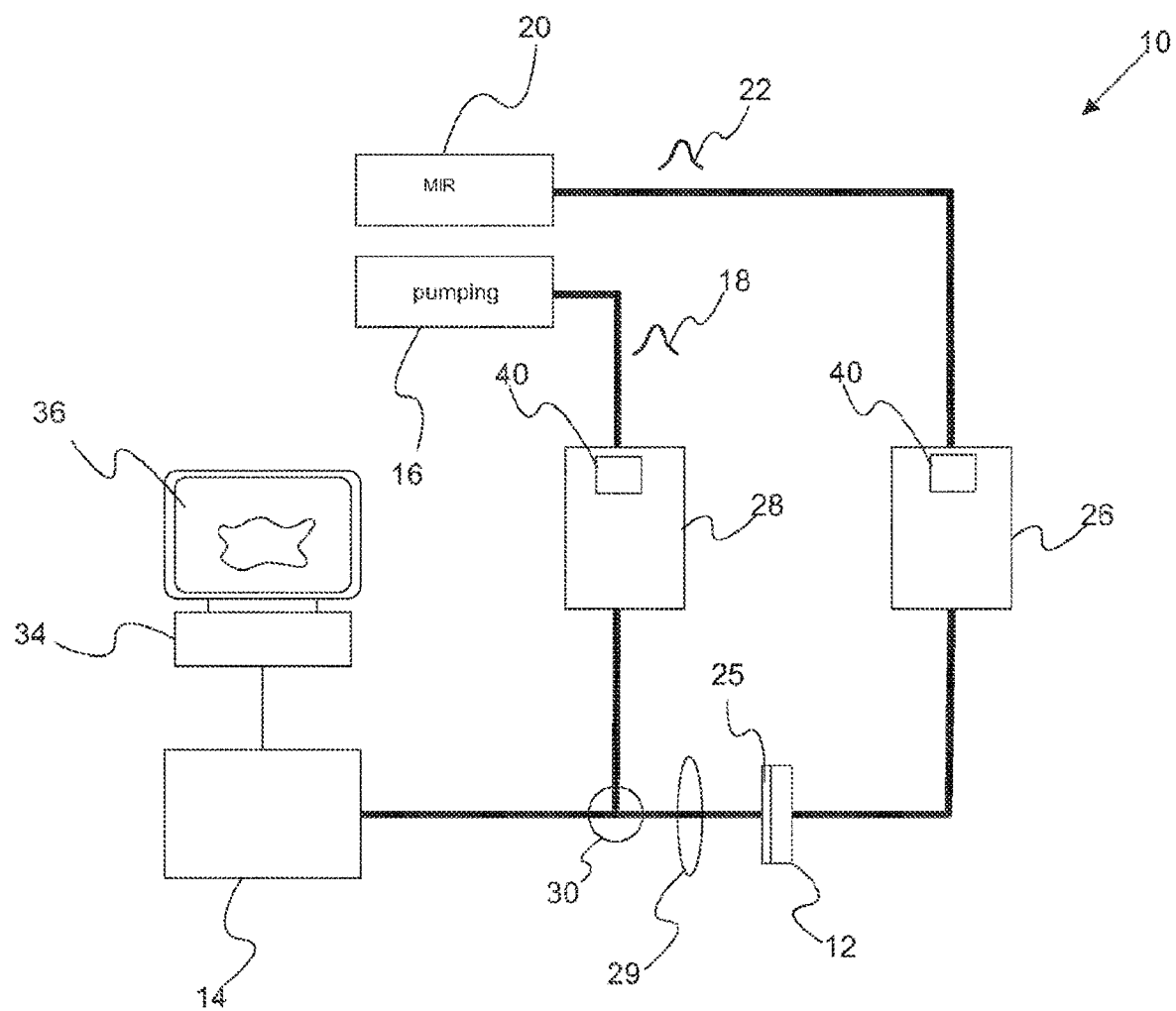
FIG. 1A. Schematic of a nondegenerate two-photon imaging system with the target sample positioned for the transmission mode.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The phrase "composed of" means "including" or "consisting of." Typically, this phrase is used to denote that an object is formed from a material.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, operating parameters and conditions (e.g., wavelengths, pulse width, repetition rates, etc.) can be practiced with plus or minus 50 percent of the values indicated rounded to or truncated to two significant figures of the value provided in the examples. In a refinement, operating parameters and conditions (e.g., e.g., wavelengths, pulse width, repetition rates, etc.) can be practiced with plus or minus 30 percent of the values indicated rounded to or truncated to two significant figures of the value provided in the examples. In another refinement, operating parameters and conditions (e.g., wavelengths, pulse width, repetition rates, etc.) can be practiced with plus or minus 10 percent of the values indicated rounded to or truncated to two significant figures of the value provided in the examples.

When a computing device is described as performing an action or method step, it is understood that the computing devices is operable to perform the action or method step typically by executing one or more line of source code. The actions or method steps can be encoded onto non-transitory memory (e.g., hard drives, optical drive, flash drives, and the like).

The term "computing device" refers generally to any device that can perform at least one function, including communicating with another computing device.

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

Throughout this application, where publications are referenced, the disclosures of these publications in their entireties are hereby incorporated by reference into this application to more fully describe the state of the art to which this invention pertains.

Abbreviations;

"APPPO" means poly(2,6-dimethylphenylene oxide-co-N-(2,6-dimethylphenylene oxide) aminopyrene).
"CCD" means charge-coupled device.
"CM" means curved mirror.
"FTIR" means Fourier transform IR.
"IR" means infrared.
"MCT" means HgCdTe.
"MIR" means mid-infrared.
"NW" means near-infrared.
"NTA" means nondegenerate two-photon absorption.
"NLO" means nonlinear optical.
"OD" means optical density.
"OPO" means optical parametric oscillator.

In general, a method and systems for infrared chemical imaging through nondegenerate two-photon absorption is provided. The method includes a step of providing pulsed or continuous wave radiation having pumping photons at a near-infrared wavelength and providing pulsed or continuous wave radiation having mid-infrared photons at a mid-infrared wavelength. Typically, the mid-infrared photons are provided with peak intensities less than 50 W/cm$^2$. The mid-infrared photons are directed onto a target sample. The pumping photons are directed to be co-incident with the mid-infrared photons at an imaging element. The method also includes a step of spatially and temporally overlapping the mid-infrared photons with the pumping photons (on each imaging element of the array or matrix in a camera). In the variation where near-infrared photons (i.e., the pumping photons) and mid-infrared photons are provided as pulses, the mid-infrared photon pulses and the pumping photon pulses overlap spatially and temporally. Therefore, a mid-infrared photon pulse and a near infrared pulse can arrive at an imaging element at the same location and at the same time, i.e., they are co-incident. The mid-infrared photons and the pumping photons are directed onto a camera having an array or matrix of imaging elements. In a refinement, the array or matrix of imaging elements includes greater than 1000 imaging elements (e.g., pixels) along a first direction and greater than 1000 imaging elements along a second direction (e.g., 1392×1040 array). Characteristically, the sum of photon energy for each temporally and spatially overlapping mid-infrared photon and pumping photon is greater than or equal to the direct or indirect bandgap energy. In some variations, time delays between the pumping photons (e.g., pumping photon pulses) and the mid-infrared photons (e.g., mid-infrared photon pulses) can be stepped through to sample slices of the target sample. The slices can be reconstructed to form a three-dimensional image of the target sample. Advantageously, the method allows background-free 3D MIR imaging of weakly reflective interfaces of organic materials, objects underneath a MID-IR transparent material (e.g., GaAs or silicon wafer) and even targets hidden underwater (e.g., a 190 μm layer of water) using MIR illumination doses as low as 0.4 mW/cm$^2$.

Figure 1B:
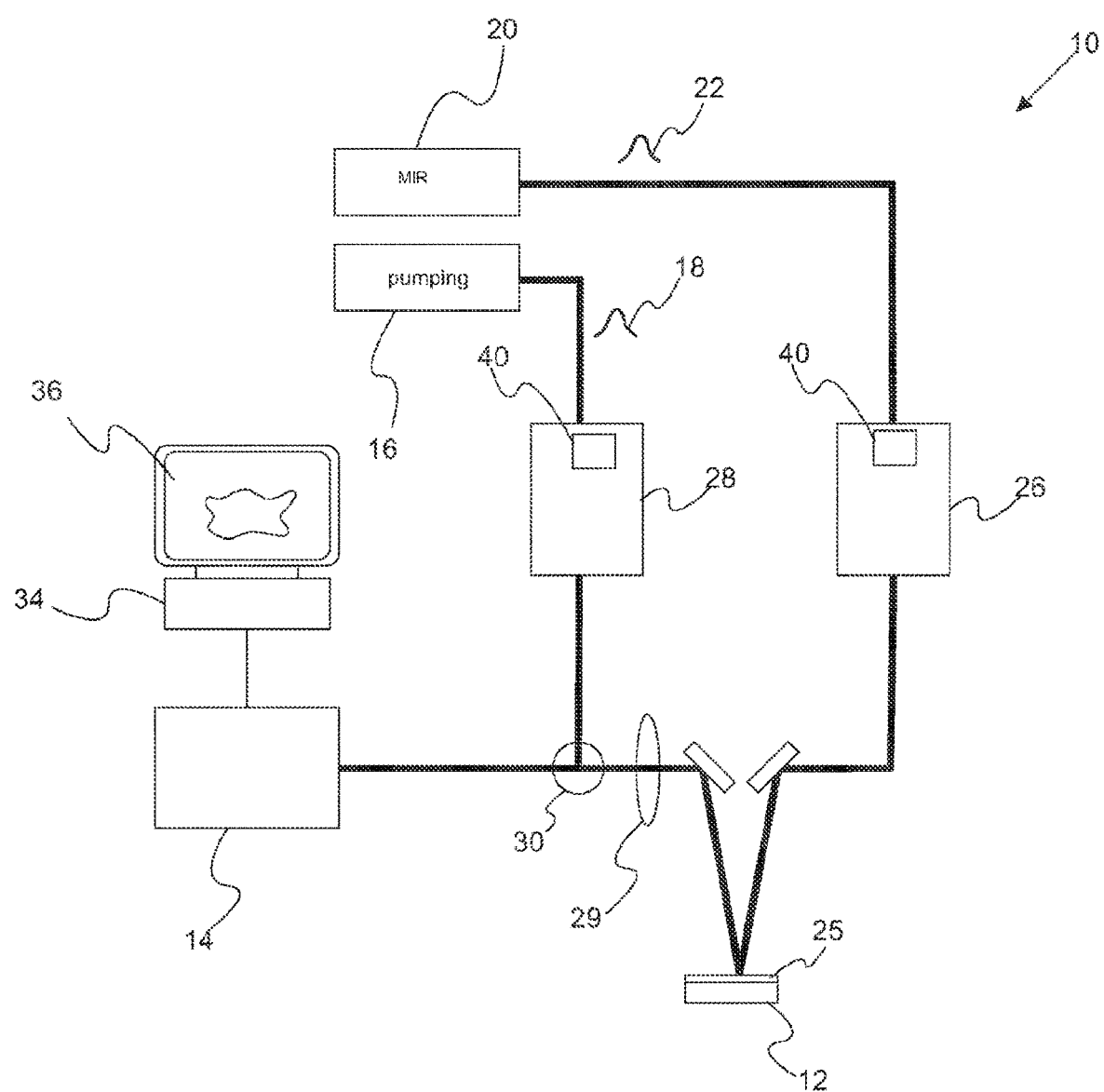
FIG. 1B. Schematic of a nondegenerate two-photon imaging system with the target sample positioned for the transmission mode.

With reference to FIGS. 1A and 1B, schematic illustrations of an imaging system using nondegenerate two-photon absorption are provided. Imaging system 10 includes a sample holder 12 for positioning a target sample to be imaged. In a refinement, the sample holder is motorized allowing automatic translation of the target sample. Such translation is useful for obtaining multiple images of a target sample that can be stitched together. Imaging system 10 includes camera 14. Typically, camera 14 has an array or matrix of imaging elements as set forth above. Each imaging element includes a semiconductor having a direct or indirect bandgap energy. Examples of semiconductors with an indirect bandgap include, but are not limited to, crystalline silicon or germanium. Examples of semiconductors with a direct bandgap include, but are not limited to, crystalline forms of InGaAs(P), GaAs, ZnSe, CdSe, Cu$_2$O, and GaN. The use of direct bandgap semiconductors provides a number of advantages. Indirect bandgap semiconductors provide an established widely used detection technology, especially for Si. In particular, there exists available electronic and design solutions for high speed and sensitive cameras as CCD and sCMOS technology for indirect bandgap semiconductors. Moreover, the indirect bandgap semiconductors allow for simplicity of crystal growing technology. Finally, silicon and germanium typically have smaller bandgaps than most of direct semiconductors, and therefore exhibit some enhancement of nonlinearity according to the scaling law (see for example, Hutchings, D. C. & van Stryland, E. W. "Nondegenerate two-photon absorption in zinc blende semiconductors" J. Optical Soc. Am. B9, 2065-2074 (1992); the entire disclosure of which is hereby incorporated by reference).

Camera 10 is configured to provide image data to a device (e.g., a computer with monitor) for displaying an image of the target sample. Imaging system 10 also includes a first photon source 16 of pulsed or continuous wave radiation that provides pumping photons 18 at a near-infrared wavelength. A second photon source 20 of pulsed or continuous wave radiation provides mid-infrared photons 22 at a mid-infrared wavelength typically having a peak intensities less than 50 W/cm$^2$. In should be appreciated that the reference to a near-infrared wavelength and mid-infrared wavelength can include a narrow bandwidth (e.g., about 10 nm) above the referenced wavelength.

In a variation, the first photon source 16 and the second photon source 20 each independently provides light pulses of mid-infrared photons and the pumping photons. In a refinement, the pumping photon pulses 18 and the mid-infrared photon pulses 22 each independently have a time duration of 10 femtoseconds to 10 milliseconds. In a further refinement, the pumping photon pulses 18 and the mid-infrared photon pulses 22 each independently have a time duration of 35 femtoseconds to 10 milliseconds. In a further refinement, the pumping photon pulses 18 and the mid-infrared photon pulses 22 each independently have a time duration of 35 femtoseconds to 10 nanoseconds. In another refinement, the pumping photon pulses 18 and the mid-infrared photon pulses 22 each independently have a repetition rate from about 1 kHz to 150 MHz. Typically, the mid-infrared wavelength is from 2000 nm to 20000 nm, while the near-infrared wavelength is from 700 nm to 3000 nm. In another refinement, pumping photon pulses and the mid-infrared photon pulses can be generated from an optical parametric oscillator as set forth below.

Still referring to FIGS. 1A and 1B, a first optical system 26 directs the mid-infrared photons 22 onto the target sample while second optical system 28 directs the near infrared photons on a path that leads to the camera. Ultimately, the mid-infrared photons and the pumping photons are directed onto the array or matrix of imaging elements such that the mid-infrared photons and the pumping photons are spatially and temporally overlapping. In this regard, imaging system 10 also includes an imaging component 29 for directing the mid-infrared photons from the target sample to the camera. In particular, the mid-infrared photons from the focal plane of target sample are directed to the imaging plane of array or matrix. In should be appreciated that pumping photons do not typically pass through the imaging component 29. In a variation, imaging component 29 includes one or more imaging lenses. In a refinement, second optical system 28 directs the pumping photons onto combining element 30 (e.g., a dichroic beam combiner and/or splitter) which can deflect the pumping photons to the camera. Both first optical system 26 and second optical system 28 can include various optical components for filtering, delaying, and shaping light beams. In particular, the first optical system 26 and/or the second optical system 28 can include a photon delay line for adjusting a time delay between the pumping photons and the mid-infrared photon pulses to ensure temporal overlap. Combining element 30 provides for spatially and temporally overlapping the mid-infrared photons with the pumping photons. Advantageously, combining element 30 co-incidently directs the mid-infrared photons and the pumping photons onto the array or matrix of imaging elements. Characteristically, the sum of photon energy for each temporally and spatially overlapping mid-infrared photon and pumping photon is greater than or equal to the indirect or direct bandgap energy.

FIG. 1A depicts a variation in which the sample holder 12 positions a sample 25 such that mid-infrared photons 22 pass through the sample 25 (i.e., a transmission mode). FIG. 1B depicts a variation in which the sample holder 12 positions a sample 25 such that mid-infrared photons 22 reflect or scatters from the sample 25 (i.e., a reflection mode). The transmission mode is typically used for 2D imaging, while the reflection mode can be used for both 2D and 3D imaging.

Referring to FIGS. 1A and 1B, imaging system 10 can include a computing device 34 configured to display the image on display 36. Computing device 34 will typically be in electrical communication with camera 14, thereby allowing transfer of image data. In a refinement, computing device 34 is further configured to subtract the background from the image. In this context, the background is that part of the image corresponding to the region outside of the target sample. Advantageously, the background may be measured only once for a given intensity of the pumping photons (e.g., pumping photon pulses) as set forth below in more detail Typically, during imaging, the mid-infrared wavelength is selected to be off-resonance to a vibration mode for a compound in the target sample. Off-resonance allows deeper penetration into the target sample. Therefore, off-resonance can be useful for tomography and 3D image reconstruction. The wavelength used for off-resonance is largely determined by the spectral range of the imaging system. For example, the spectral range can be 2 to 20 microns. Therefore, the wavelength of the off-resonance for mid-infrared photons 22 should be in this range. In a refinement, the spectral range is from 3 to 12 microns. In another refinement, the mid-infrared wavelength is selected to be on resonance to a vibration mode for a compound in the target sample. As shown below, off-resonance results in improved contrast in the sample image and better depth penetration (than on resonance imaging).

Figure 1C:
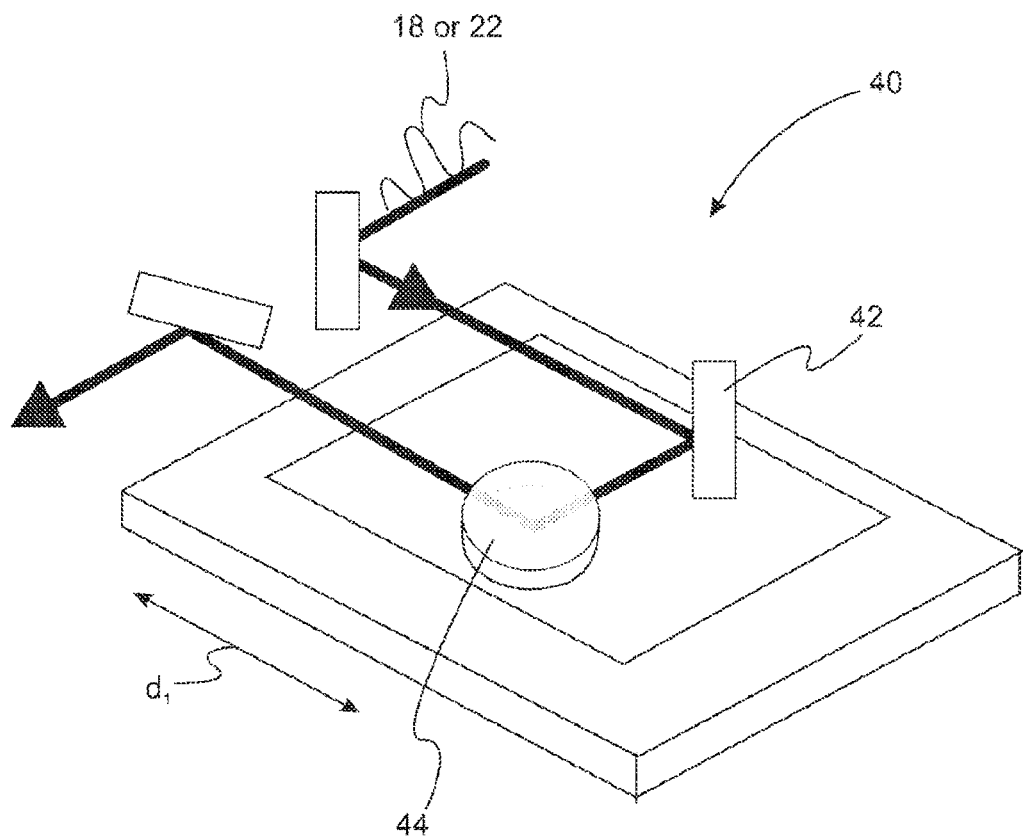
FIG. 1C. Schematic of a delay line used in the systems of FIGS. 1A and 1B.
Figure 2:
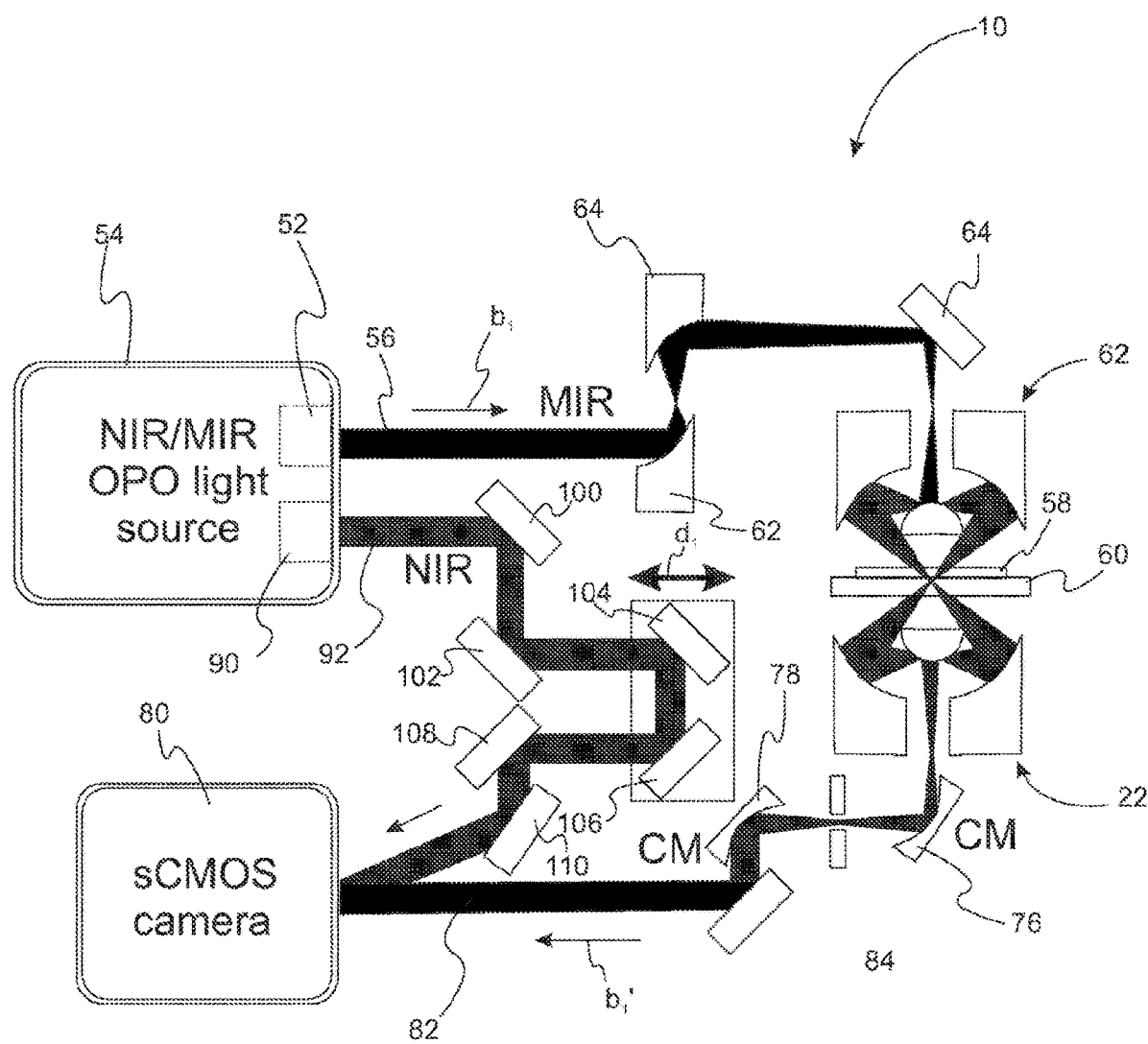
FIG. 2. Schematic of a microscope applying the nondegenerate two-photon imaging method.

As set forth above, one or both of first optical system 26 and second optical system 28 can include a photon delay line 40 that can adjust the time delay between the pumping photon pulses 18 and the mid-infrared photon pulses 22 in order to achieve temporal overlay of the pumping photon pulses 18 and the mid-infrared photon pulses 22 when detected by camera 14. For example, temporal overlap between photon pulses 18 and the mid-infrared photon pulses 22 can be controlled through a mechanical delay stage with a set of mirrors combined optionally with other optical components to adjust the light path for one or both of the pumping photon pulses 18 and the mid-infrared photon pulses 22. FIG. 1C provides a schematic of such a photon delay line. Photon delay line 40 includes a first mirror 42 and a second mirror 44 mounted on a translation stage 46. In a refinement, translation stage 46 is operable to be translated along liner direction di. During operation of imaging system 10, the translation stage is position such that there is temporal overlap between photon pulses 18 and the mid-infrared photon pulses 22 when the combination reaches the imaging elements in camera 14. Moreover, for 3D imaging, the translation stage can be moved to scan different slices of sample 22. For example, the time delays between the pumping photon pulses and the mid-infrared photon pulses can be stepped through to sample adjacent slices of the target sample. The slices can be reconstructed to form a three dimension image of the target sample. Typically, computing device 34 will receive the image data for the slices and construct the three dimension image of the target sample. It should be appreciated that other mechanical delay line known to those skilled in the art can be used, even designs using one mirror.

Advantageously, the sample image can be rendered in a single shot without phase-matching of mid-infrared and pumping photons in a nonlinear conversion medium and without a need for post-acquisition image reconstruction. In a refinement, the sample image can be obtained from a single combination pulse of a mid-infrared and a pumping pulse ("combination pulse). In another refinement, the sample image can be obtained from a sum or integration of a plurality of such combination pulses. The number of combination pulses sampled may depend on the time response of the imaging elements. In a further refinement, the sample image can be obtained from a sum or integration of 2 to 100 combination pulses. In some variations, a photon energy ratio of the mid-infrared photon pulses to the pumping photon pulses is greater than, in increasing order of preference, 0.2, 0.3, 0.4, 0.5, or 0.6.

Figures 1, 2, 3, 8A:
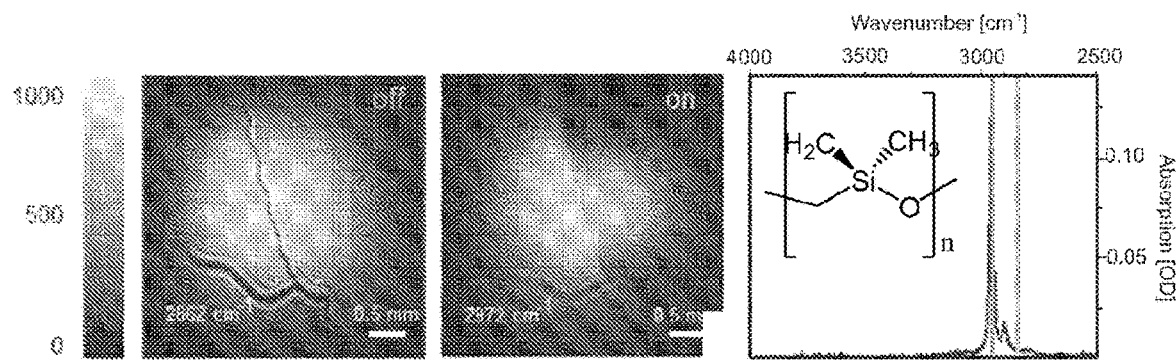
Figures 1, 2, 3, 8B:
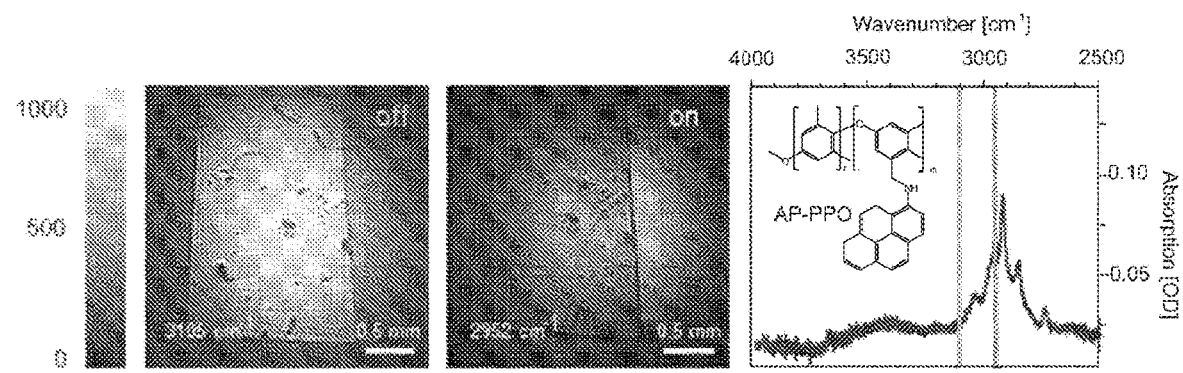
Figures 1, 2, 3, 8C:
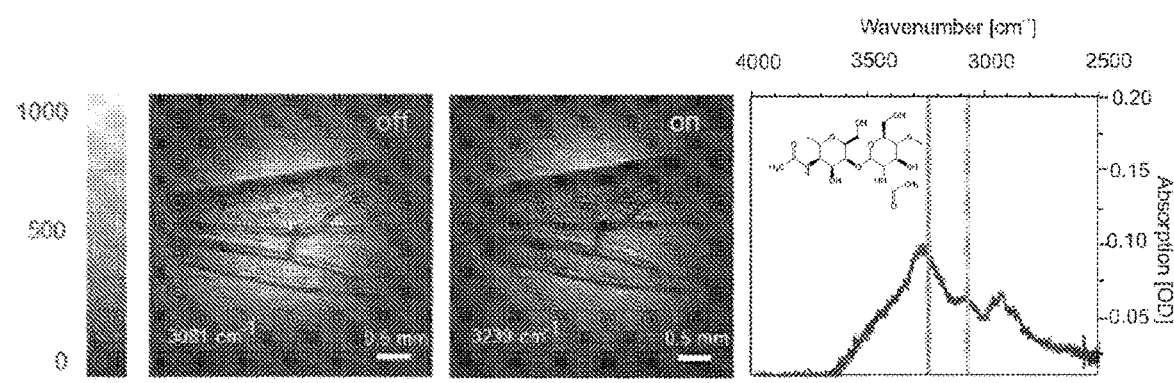

In another embodiment, a wide-field microscope including the imaging systems set forth above is provided. Such a wide-field microscope can include a microscope objective system that including one or more optical components of the first optical system 26 and/or the second optical system 28 of FIGS. 1A and 1B. FIG. 3 depicts a wide-field microscope of that has a microscope objective system that includes first Cassegrain objective and second Cassegrain objective. Mid-infrared photons (i.e., pulsed or continuous as set forth above) are provided from first light source 52 optionally contained within NIR/MIR OPO light source 54. A light beam 56 of the mid-infrared photons follow light path $b_1$ to target sample 58 positioned on sample holder 60. Wide-field MIR microscope 50 includes two off-axis parabolic mirrors 62 and 64 to condition the MIR beam before it is projected onto a target sample 58 on sample holder 60 by a Cassegrain objective lens (condenser) 62 to a spot (e.g., 0.4×0.4 mm² spot). In a refinement, sample holder 60 is an automated translation stage. Microscope 50 may include additional optical elements 64 to shape and/or direct the light beam to the target sample. Formally, parabolic mirrors 52 and 54, Cassegrain objective lens (condenser) 62, and additional optical elements are part of first optical system 26 of FIGS. 1A and 1B. The light is subsequently captured by a second Cassegrain objective 72, and projected with two focusing mirrors 76 and 78 onto imaging elements in camera 80 (e.g., an sCMOS chip). The path of light beam 82 of the captured mid-infrared light is indicated by arrow $b_1'$. The captured light can include scattered light or reflected light or transmitted light or any combination thereof. An aperture-based filter 84 is used to reduce the effect of interfering back reflections.

Still referring to FIG. 3, pumping photons are provided from second first light source 90 optionally contained within NIR/MIR OPO light source 54. Typically, the pumping photons are near-infrared photons. A light beam 92 of the pumping photons follow light path pi to imaging elements in camera 80. To avoid losses and interfering elements, the pump beam 90 is directed off-angle (non-collinear) relative to the MIR beam. The latter is possible because NTA does not depend on phase-matching between the beams. The angle will be tuned sufficiently small to ensure that the temporal tilt introduced will be well within the time duration (e.g., ~3 ps) of the pulses when pulsed light is used. The light beam of the pumping photons can be directed by optical components such as mirrors 100-110 which are formally part of the second optical system 28 of FIGS. 1A an 1B. In a refinement, a photon delay line adjusts the time delay between the pumping photon pulses and the mid-infrared photon pulses are described above. The photon delay line includes mirrors 104 and 106 are mounted on a translation stage 114 which is operable to be translated along liner direction di. Advantageously, in the design of FIG. 3 the pumping (gate) photons does not traverse the microscope. Therefore, co-alignment issues are circumvented while at the same time potential photodamage to the sample by the pumping photons is avoided.

Additional details of the invention are found in D. Knez, A. M. Hanninen, R. C. Prince, E. O. Potma, and D. A. Fishman, *Infrared chemical imaging through nondegenerate two-photon absorption in silicon-based cameras*, Light: Science & Applications 9, 125 (2020); the entire disclosure of which is hereby incorporated by reference.

The following examples illustrate the various embodiments of the present invention. Those skilled in the art will recognize many variations that are within the spirit of the present invention and scope of the claims.

1. Chemically Selective 2D Imaging.
1.1 MIR Detection with a Si Photodiode

Figure 3A:
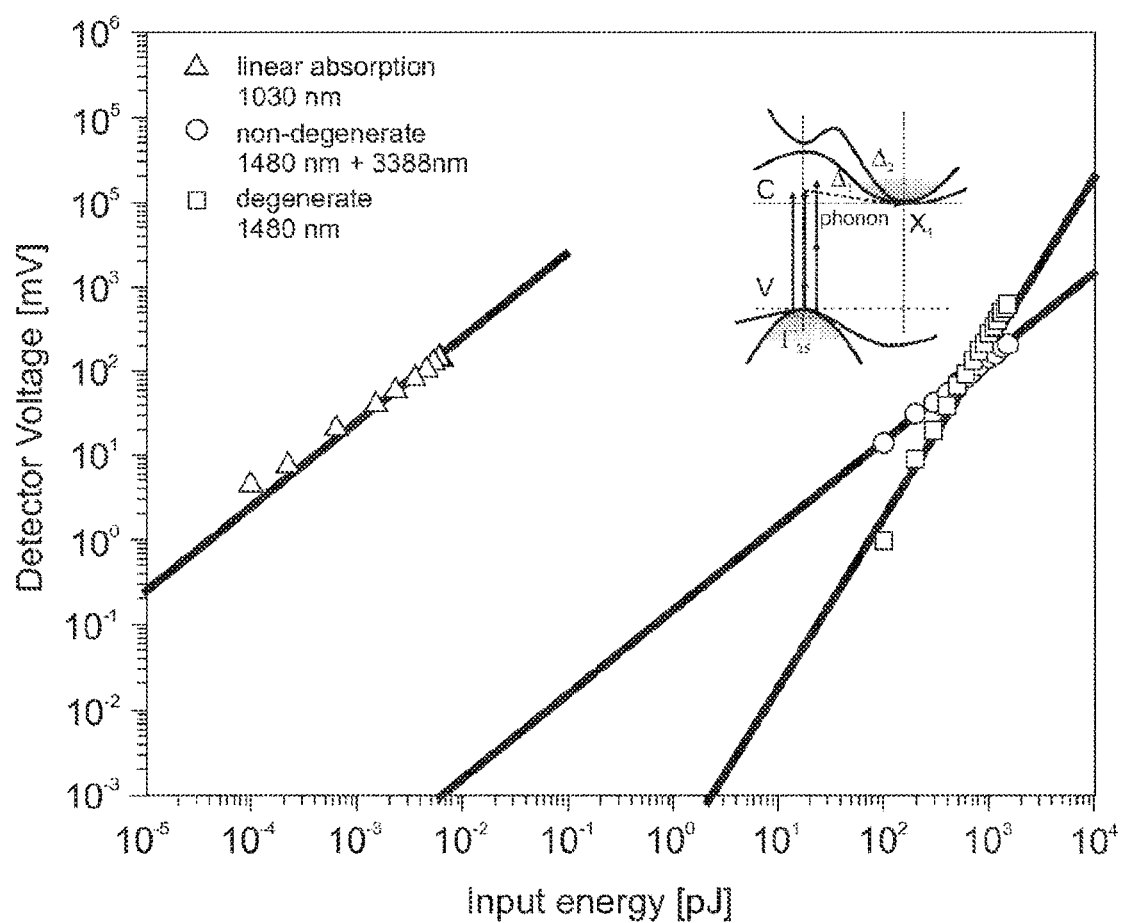
FIGS. 3A and 3B. Detection of weak infrared radiation via nondegenerate two-photon absorption in a-Si photodiode.

The utility of Si as a MIR NTA detector using picosecond pulses of low peak intensities. In FIG. 3A, the linear absorption of 9708 cm⁻¹ (1030 nm) photons by a standard Si photodiode is compared with that of NTA for a 2952 cm⁻¹ (3388 nm) MIR and 6756 cm⁻¹ (1480 nm) pump pulse pair. Since the 1030 nm photon energy exceeds the Si bandgap energy (Eg ~1.1 eV (1100 nm)), strong one-photon absorption can be expected. Based on this measurement, the estimated responsivity is R=0.2 A/W, close to the reported response for Si detectors at 1030 nm. In the NTA experiment, the MIR and pump photon energies add up to the same energy (9708 cm-1) as in the one-photon experiment, and thus expect a response in Si is expected, albeit weaker. The current photon energy ratio is ħωpump/ħωMIR=2.2. The NTA response is shown with circles and compared with the degenerate two-photon absorption of the pump pulse. As expected, the NTA signal scales linearly with the NIR pulse energy. Previously reported values of $a_{2d}$~2 cm/GW [48] for degenerate and $a_{2n}$~5 cm/GW [51] for nondegenerate cases with comparable photon ratio agree well with the present observations. Note that there is a regime where the NTA is stronger than the degenerate two-photon absorption of the pump, using 6.5 nJ MIR pulse at 3388 nm.

Figure 3B:
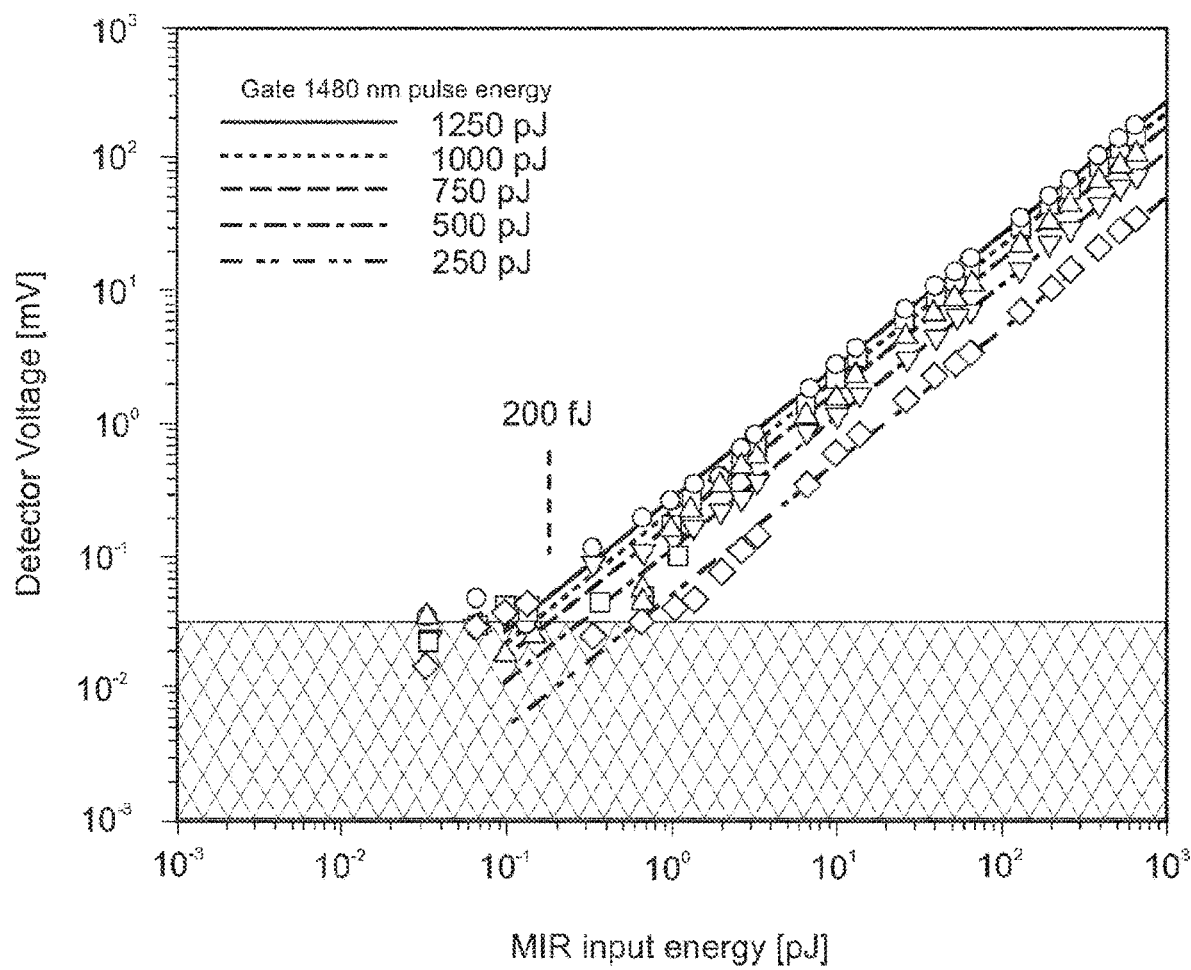

Next, sensitivity of MIR detection through NTA in Si is evaluated. In FIG. 3B, the detected NTA signal is plotted as a function of the MIR pulse energy MIR (at 2952 cm⁻¹) for various energies of the pump pulse. For these experiments, especially at higher NIR peak intensities, the degenerate contribution of pump pulse has been subtracted using modulation of the MIR beam and lock-in detection. It is observed that the signal scales linearly with the MIR pulse energy for all settings. The minimally detectable MIR picosecond pulse energy is ~200 fJ using rather modest NIR pump peak intensities. In previous work with a direct large-bandgap GaN detector, a detection limit of 100 pJ has been reported, using femtosecond pulses and a photon energy ratio >10. [36] Higher detection sensitivities in Si are observed while using picosecond pulses and a much lower photon energy ratio. Such high detection sensitivities are remarkable and are due in part to the favorable pulse repetition rate (76 MHz) used in the current experiment, offering much better sampling compared to kHz pulse repetition rates used previously. The strategy used here offers superior sensitivity, detecting 4 orders of magnitude smaller MIR peak intensities of 20 W/cm² (with 0.09 MW/cm² at 1480 nm pump pulse) versus 0.2 MW/cm² (with 1.9 GW/cm² at 390 nm pump pulse) as previously reported.

Given that enhancement scales with the photon energy ratio, it is expected even greater sensitivities for experiments with higher pump photon energies and lower MIR photon energies, with a projected detection floor as low as a few tens of fJ (1 W/cm²).

1.2 MIR Spectroscopy with a Single Pixel Si Detector

Figure 4:
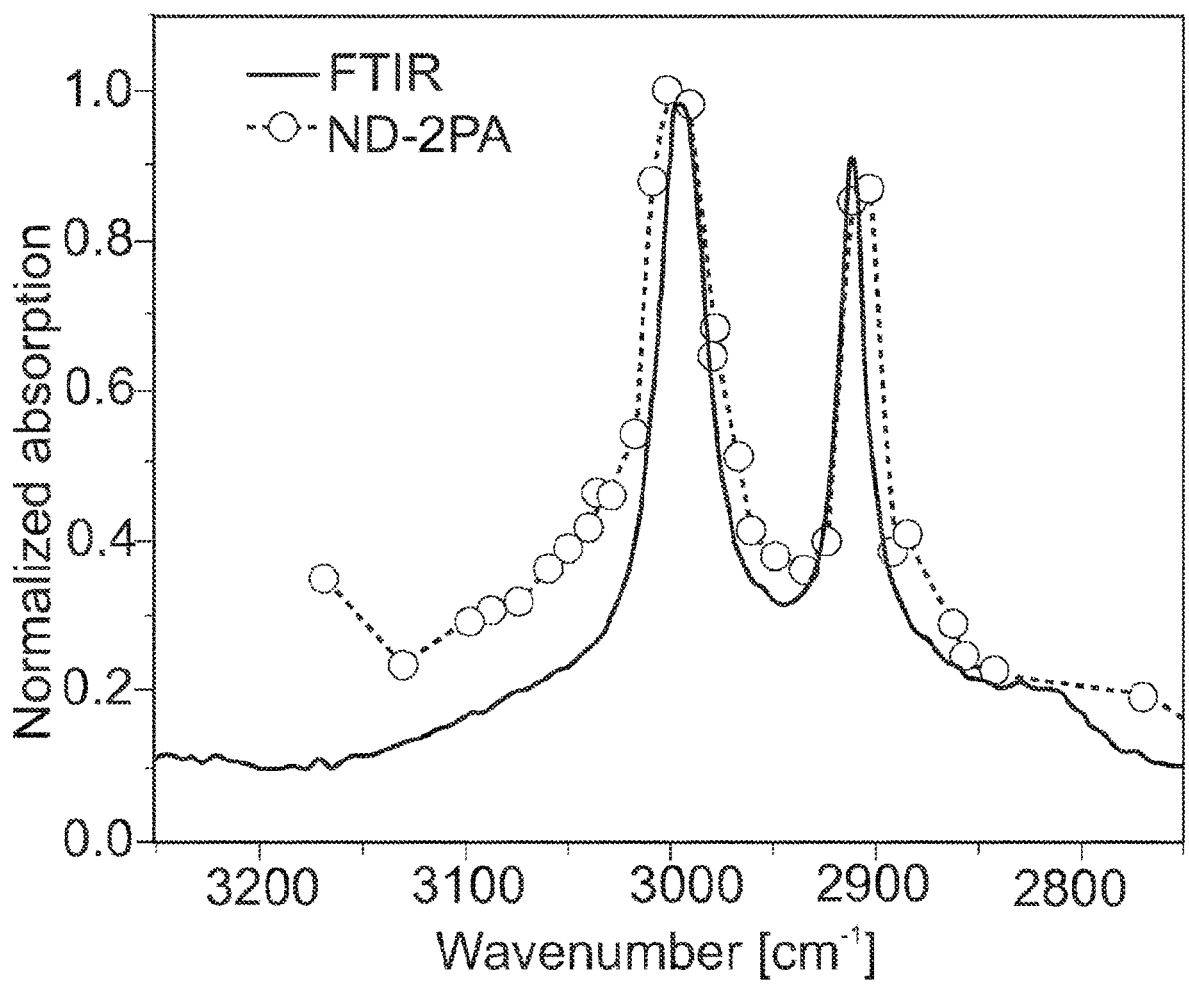
FIG. 4. Absorption spectrum of dimethyl sulfoxide (DMSO) using nondegenerate two-photon detection for measuring the transmitted MIR radiation. Results are in excellent agreement with the spectrum measured obtained with conventional ATR-FTIR of bulk DMSO.

As an example of the utility of MIR detection with a Si photodetector, a simple MIR absorption spectroscopy experiment by a 10 μm film of dimethyl sulfoxide (DMSO) is performed. For this purpose, the MIR energy in the 2750-3150 cm⁻¹ range is scanned and detect the transmission MIR via NTA on the Si photodiode is detected. The absorption of the film of this thickness is estimated as OD=0.03. The spectral resolution is determined by the spectral width of the picosecond pulse, which corresponds to ~5 cm⁻¹. For these experiments, the MIR pulse has been kept at 15 mW (~10 kW/cm² peak intensity) while the NIR pump beam is set to 100 mW (66 kW/cm²). Because the pump and MIR pulses are parametrically generated by the same source, there is no temporal walk-off on the picosecond timescale while performing the scan. The resulting DMSO absorption spectrum shows the characteristic lines associated with the symmetric and asymmetric C-H stretching modes [65], which corroborates the Fourier transform IR (FTIR) absorption spectrum (FIG. 4, see Methods).

Figure 5:
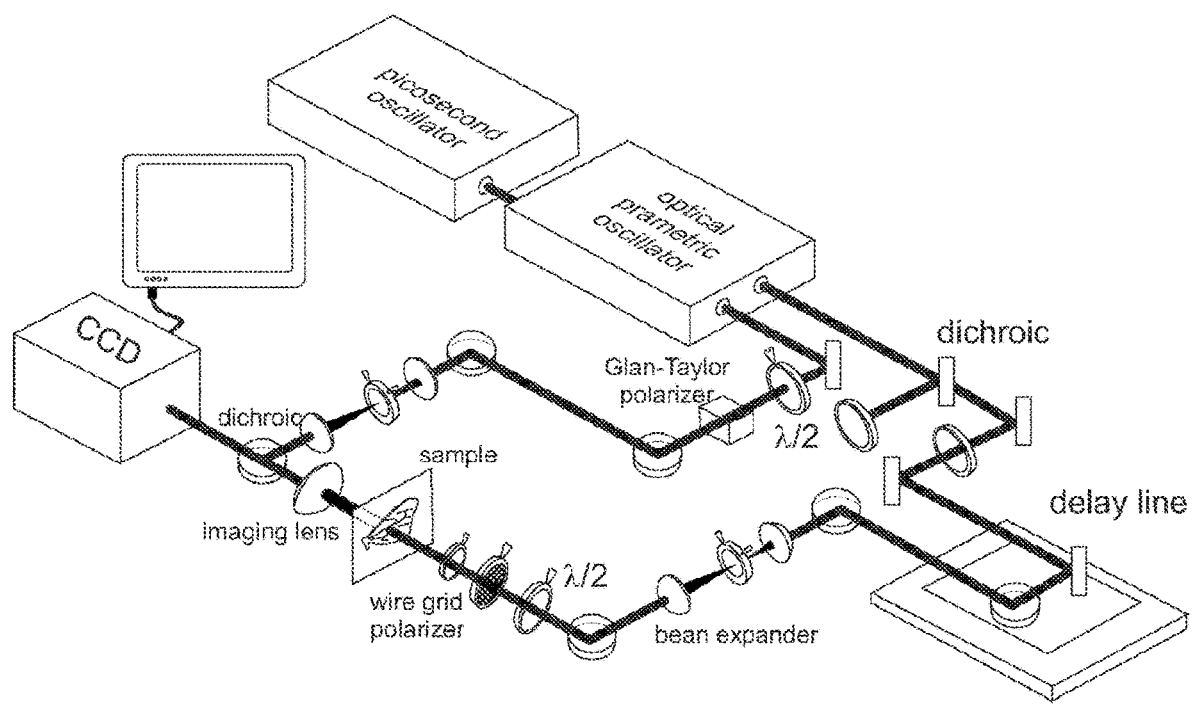
FIG. 5. Schematic of wide-field MIR imaging system based on nondegenerate two-photon absorption in a Si-based CCD camera.

1.3 MIR Imaging Through On-Chip Nondegenerate Two-Photon Absorption in a CCD Camera Given the excellent NTA performance of a single-pixel Si detector, the feasibility of MIR imaging through direct on-chip NTA in a Si-based CCD camera is explored next. FIG. 5 provides a schematic representation of the MIR wide-field imaging system based on NTA. The pump and MIR beams are generated by a 4 ps, 76 MHz optical parametric oscillator (OPO), and are expanded to a beam diameter of ~3 mm. The MIR arm contains the sample and a 100 mm $CaF_2$ lens to map the image in a 1:1 fashion onto the CCD sensor. The pump beam is spatially and temporally overlapped with the MIR beam with the aid of a dichroic mirror so that both beams are coincident on the CCD chip. Note that phase-matching is not important for NTA, implying that the angle of incidence of the pump beam can be adjusted freely. Here a conventional, Peltier-cooled CCD camera (Clara, Andor), featuring 6.45 $\mu m^2$ pixels in a 1392×1040 array, is used. The current magnification and effective numerical aperture of the imaging lens (NA=0.015) provides an image with ~100 µm resolution, corresponding to about 20 pixels on the camera. Though not the ultimate goal of the current experiments, better spatial resolution can be easily achieved using focusing systems of higher numerical aperture.

Figures 1, 2, 6A, 6B:
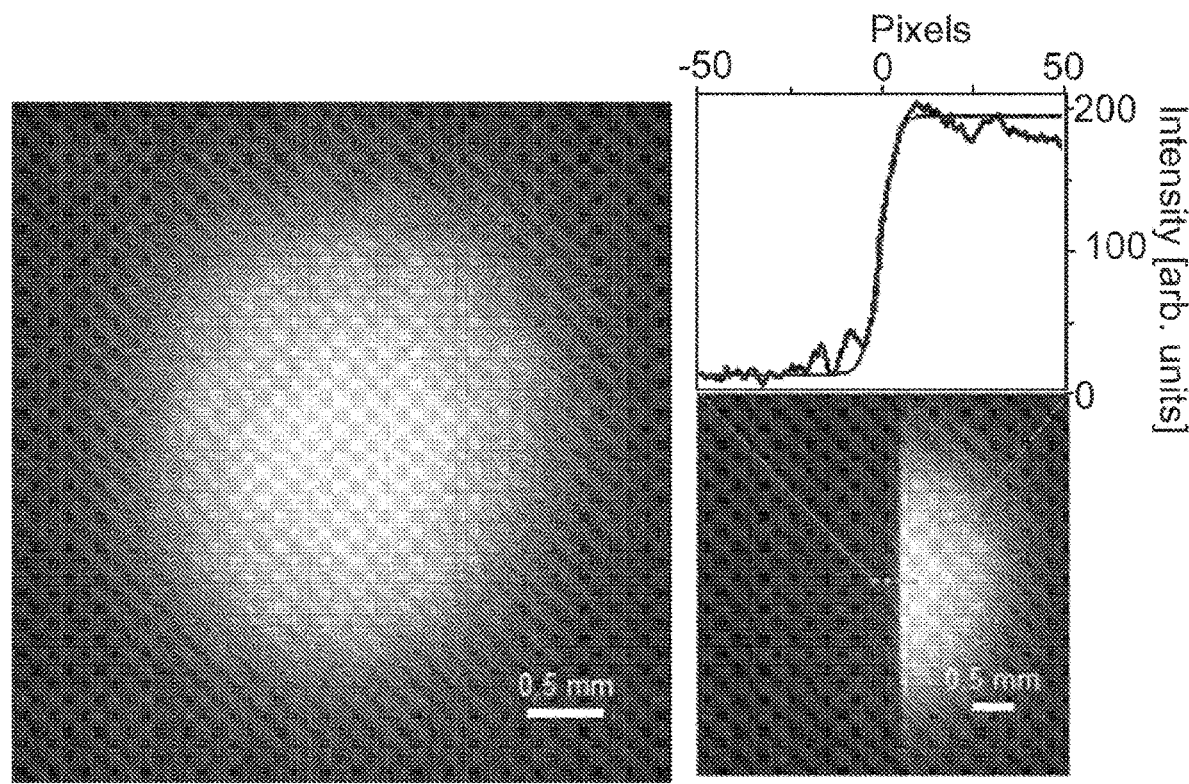
Figure 9A:
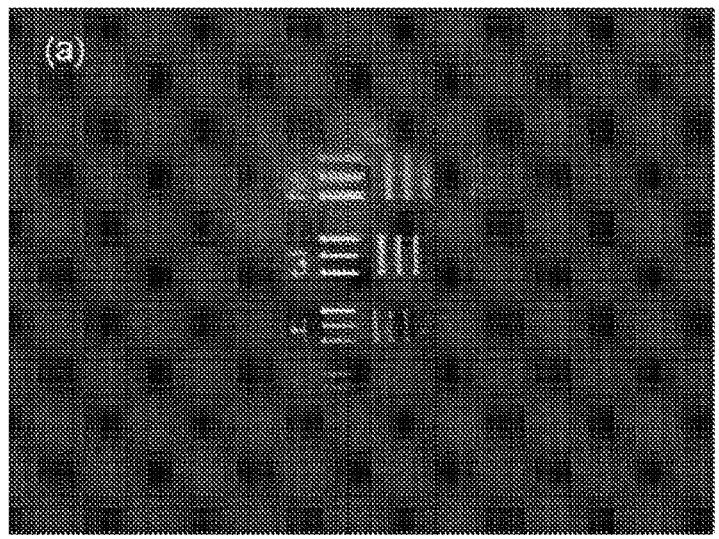
FIGS. 9A and 9B. Negative USAF 1951 test chart. (A) column 2, (B) column 1. The image was taken at 2947 cm$^{-1}$.
Figure 9B:
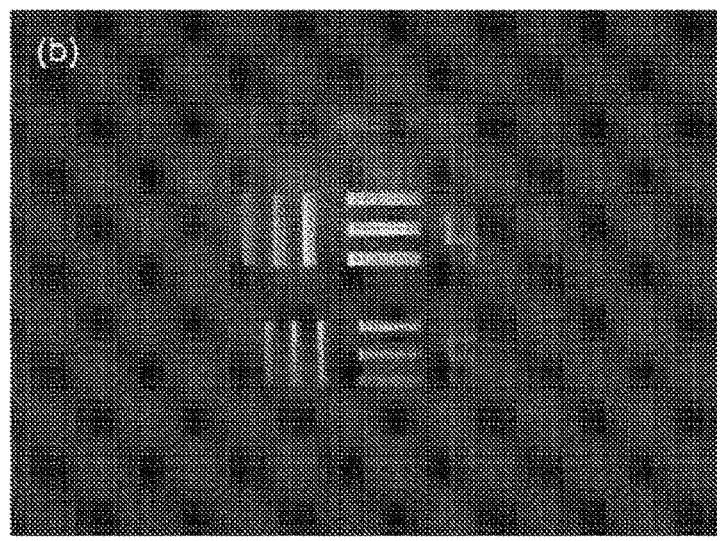

In FIG. 6A, the NTA image of the MIR beam projected onto the CCD sensor using 1 s exposure time is shown. The degenerate background signal has been subtracted to solely reveal the MIR contribution. With the current experimental arrangement, the background has to be measured only once for a given NIR pump intensity and can be subtracted automatically during imaging, requiring no further post-processing. Here we have used peak intensities of ~1.5 $kW/cm^2$ for the MIR beam and ~1.4 $kW/cm^2$ for the NIR pump beam. Under these conditions, each camera pixel only receives pulse energies on the order of a few O. In FIG. 6B, the same MIR beam with a razor blade blocking one half of the beam is shown, clearly emphasizing the attained MIR contrast. The fringing at the blade's interface is a direct consequence of light diffraction at the step edge. More images of test targets, including MIR images of a USAF test chart, are provided in FIG. 9.

Figure 10A:
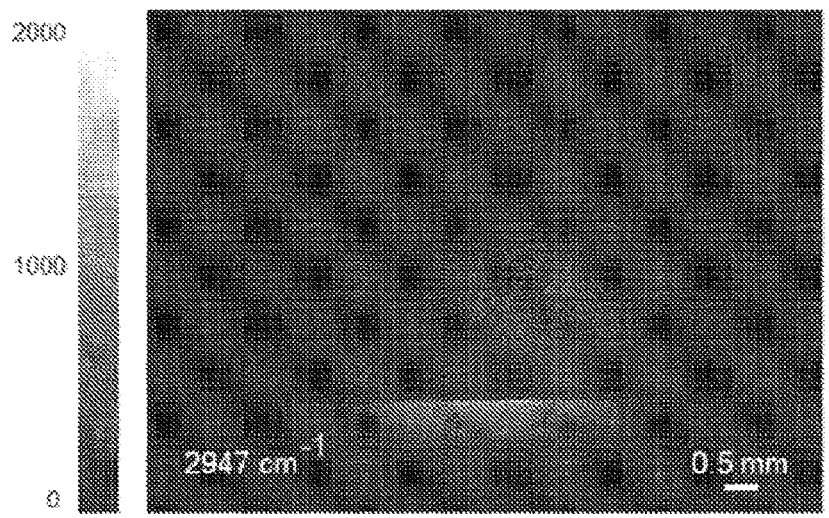
FIGS. 10A and 10B. Spectral MIR imaging of a 150 μm cellulose acetate film. The numbers printed with black ink serve as a mask to indicate contrast.
Figure 10B:
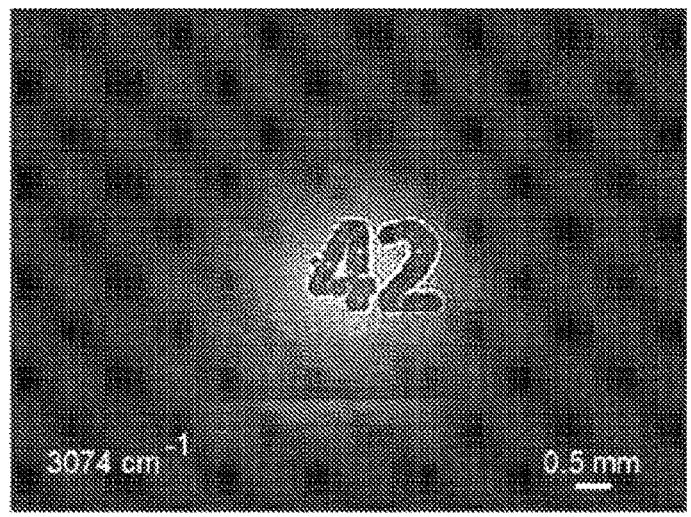

For the current experimental conditions, we find that MIR intensity changes on the order of $10^{-2}$ OD in the image are easily discernable even with exposure times shorter than 1 s. To demonstrate chemical imaging capabilities, we perform MIR imaging on a ~150 µm thick cellulose acetate sheet commonly used as transparencies for laserjet printing. FIG. 7A depicts the FTIR spectrum of cellulose acetate in the 2500 $cm^{-1}$-3500 $cm^{-1}$ range, showing a clear spectral feature due to C-H stretch vibrational modes. In FIG. 7B, a strip of the cellulose acetate sheet is imaged at 3078 $cm^{-1}$, off-resonant with the C-H stretching vibration. Transmission through the sheet is high because of the lack of absorption. To highlight the contrast, the letters "C-H" have been printed with black ink directly onto the material, providing a mask with limited transmission throughout the 2500 $cm^{-1}$-3500 $cm^{-1}$ range. When tuning into the CH-mode resonance (FIG. 7B, 3001 $cm^{-1}$), the transmission is seen to reduce, resulting in lower contrast between the ink and the film. When the MIR is tuned to the maximum of the absorption line (FIG. 7, 2949 $cm^{-1}$), the limited transmission through the film completely eliminates the ink/film contrast. The relative magnitude of MIR absorption, extracted from the images, maps directly onto the absorption spectrum in FIG. 7A, demonstrating quantitative imaging capabilities. The observed contrast is based on a rather modest absorption difference of only $7*10^{-2}$ OD. Additional examples of MIR imaging of printed cellulose acetate samples can be found in the FIG. 10.

With the wide-field MIR imaging capabilities thus established, we highlight several examples of chemical imaging of several common materials. To suppress contrast due to refractive index differences, we have suspended the materials in (vibrationally non-resonant) $D_2O$ to reveal true absorption contrast. FIG. 8A depicts the interface between $D_2O$ and a ~20 µm thick polydimethylsiloxane film, a silicon-based organic polymer commonly used as vacuum grease. The difference between the images taken on and off-resonance with the methyl stretching mode reveals clear chemical contrast. Similarly, chemical contrast is evident when turning on and off the C-H stretching resonance of a 30 µm membrane of poly(2,6-dimethylphenylene oxide-co-N-(2,6-dimethylphenylene oxide) aminopyrene), a material of considerable interest as an ion-exchange membrane. Lastly, we demonstrate MIR imaging of a bee's wing, a rather complex natural structure that is rich in chitin. The chitin MIR spectrum in the 2500 $cm^{-1}$-3500 $cm^{-1}$ range contains overlapping contributions from OH-, NH- and CH-groups, resulting in broad spectral features. The absorption difference between the 3239 $cm^{-1}$ and 3081 $cm^{-1}$ vibrational energies is AOD=0.04, yet the contrast difference is still evident from the NTA MIR image.

1.4 MIR Videography of Sample Dynamics

The signal strength is sufficient for MIR imaging at even faster acquisition rates. MIR imaging were recorded through NTA with a 100 ms exposure time. Given that the current camera requires an additional 100 ms of readout time per frame, the effective imaging acquisition time was pushed to 5 fps. Under these conditions, we have recorded videos of several mechanical and physical processes as well as live microorganisms. In a first exemplary video, the real-time movement of a printed target on cellulose acetate films is demonstrated, both under vibrationally off-resonance and resonance conditions. In another exemplary video, a live recording of the dynamics of the immersion oil droplet placed atop the $CaF_2$ window under vibrationally resonant conditions was recorded. The flowing droplet can be seen with clear chemical contrast in real-time. Moreover, one can observe the formation of intensity fringes near the edge of the droplet due to Fresnel diffraction and interference within the oil film, i.e., Newton's ring effect.

In another video, NTA-based MIR imaging of live nematodes suspended in $D_2O$ buffer was recorded at 3381 nm (2958 $cm^{-1}$). Image contrast is due to absorption by the methyl stretching vibrations of protein, in addition to refractive effects. The video demonstrates that active, live nematodes can be captured in real-time under the MIR illumination conditions used in NTA detection.

1.5 Discussion

In this set of experiments, it is demonstrated that the principle of NTA can be extended to MIR imaging by direct on-chip two-photon absorption in a CCD camera. This principle enables one to acquire images at 100 ms exposure times at 0-level picosecond pulse energies per pixel, experimental conditions that allow wide-field MIR imaging of live, freely suspended organisms at reasonably high frame rates. The use of a CCD camera serves as an attractive alternative to standard MIR cameras, such as cryogenically cooled MCT detectors. NTA enables good quality MIR images without cryogenic cooling, significantly reducing the complexity and costs of the detector. In addition, NTA-enabled imaging benefits from the mature technology in Si-based cameras, offering robust and affordable detection solutions. These advantages are not at the expense of sensitivity, as previous work based on MIR femtosecond pulses has shown that NTA offers comparable sensitivity to (single-pixel) MCT detectors [36].

Unlike other recent methods for improving MIR detection with visible/NIR detectors, our method takes MIR light as its direct input. Photothermal imaging, for instance, relies on MIR-induced optical changes in the sample (expansion, refractive changes), which are subsequently probed with a vis/NIR beam. NTA-based imaging is independent of secondary effects due to MIR sample illumination, as it registers intensity changes in the MIR directly. Similarly, our new NTA imaging approach differs fundamentally from SFG upconversion techniques. While the latter also uses a visible/NIR camera to generate MIR-based images, the SFG upconversion mechanism is based on a separate step that converts the MIR light with the help of a pump beam into visible radiation in an external nonlinear optical crystal [34]. To enable high conversion efficiencies, specific orientations of the crystal are needed so that a portion of the MIR image is phase-matched in the SFG process. To capture a full image, a rapid sampling of crystal orientations must be applied, followed by an image reconstruction step. Although impressive MIR imaging capabilities have been achieved with the SFG upconversion technique, the NTA method approaches comparable imaging performance at MIR and pump intensities that are an order of magnitude less. NTA avoids the external light conversion step and thus significantly simplifies the overall imaging system. Because NTA does not rely on phase-matching, it can generate images in a single shot and forgoes the need for post-acquisition image reconstruction.

Although the current work shows the feasibility of NTA-based MIR imaging, the approach can be further improved to achieve even better performance. For instance, we have used an off-the-shelf CCD camera that is not optimized for long-wavelength applications. The sensor is protected with a 1.5 mm thick silica window that shows significant attenuation of an estimated OD=1. It is trivial to replace the window with a sapphire flat, which would boost the MIR transmission by at least an order of magnitude. The frame rate of our current camera is limited, and higher frame rates can be easily achieved with more advanced models. In addition, higher NTA efficiencies can be obtained with shorter pulses. The use of high-repetition rate fs pulses would allow imaging at much lower average powers while maintaining high efficiency. It should be noted that detector arrays based on materials other than Si are also interesting for NTA applications. GaAs, for instance, exhibits significantly higher two-photon absorption efficiencies and a steeper band edge absorption than Si, which are both favorable for MIR detection through NTA. Finally, the practical implementation of the NTA imaging technique requires the availability of a pump beam in addition to a MIR source. Although OPO systems constitute a natural choice because of their broadly tunable synchronized pump/idler pulse pairs, recent developments in MIR light source technology promise alternative and more compact solutions, including efficient frequency conversion with long-wavelength fiber lasers. Such developments will likely improve the practical implementation of NTA-based imaging for a wide range of applications.

1.6 Methods

FTIR experiments. Conventional infrared absorption spectra were measured using a Jasco 4700 FTIR spectrometer both in transmission and attenuated total reflection (ATR) geometries. For ATR experiments, the Jasco ATR-Pro One accessory equipped with a diamond crystal was used. The spectra were averaged over 20 scans and acquired with a 2 $cm^{-1}$ resolution, close to the resolution of the corresponding picosecond NTA experiments.

Sample handling. Most of the prepared samples were suspended in $D_2O$ to suppress refractive effects and thus reveal pure absorption contrast. DMSO and silicone lubricant (Dow Corning) were obtained from Sigma Aldrich and used without further purification. The sample materials, including the APPPO polymer film and clipped bee wings, were immersed in $D_2O$ and confined between hermetically sealed 1 mm thick $CaF_2$ windows (diameter=1"). Experiments on cellulose acetate films were performed in air without the use of $CaF_2$ windows. C. elegans were obtained from Carolina Biological. Nematodes were picked up from agar plates with filter paper, immersed in a phosphate-buffered saline $D_2O$ solution, and placed between two $CaF_2$ windows spaced by a 50 μm Teflon spacer.

Nondegenerate two photon absorption detection with Si photodiode. We used a conventional Si photodiode (FDS100, Thorlabs) with parameters described in Tables 1 and 2. The transparent window in front of the Si material was removed to improve MIR transmission. The experiments were performed in pump-probe geometry with the setup depicted in FIG. 5, without utilizing a separate imaging lens in the MIR arm. Both MIR and NIR beams were focused onto the Si photodiode by a broadband achromat (f=100 mm) [55]. NIR intensity was varied with the combination of half-wavelength plate and Glan-Thompson polarizer. The MIR intensities were controlled by another half-waveplate and a wire-grid polarizer. The polarization of both NIR and MIR optical pulses were linear and parallel, and were kept constant throughout the experiments. The MIR beam was modulated at 160 Hz by a mechanical chopper and the NTA signal contribution was isolated by a lock-in amplifier (SR510, Stanford Instruments).

TABLE 1

| Specifications for Si photodiode experiments | |
|---|---|
| MIR pulse width | 4.1 ps |
| MIR spot size | 250 μm |
| NIR spot size | 300 μm |
| Detector impedance | 1 MOhm |
| Detector chip size | 5 mm |
| Reverse bias voltage | 12 V |
| MIR wavelength | 3388 nm |
| NIR wavelength | 1480 nm |

TABLE 2

| Specifications for Si CCD camera experiments | |
|---|---|
| MIR pulse width | 4.1 ps |
| MIR spot size | 3 mm |
| NIR spot size | 3.5 mm |
| Pixel size | 6.5 μm × 6.5 μm |
| CCD active area | 1392 × 1040 pixels |
| CCD protective window | Fused silica 1.5 mm |

Imaging using CCD camera. Si-based CCD camera (DR-328G-CO2-SIL Clara, Andor) has been used. The setup is explained in FIG. 5 as described above. A 1:1 imaging system with a f=100 mm $CaF_2$ lens to project the image onto the CCD camera (Clara, Andor) is used. For live nematode imaging the imaging system was changed to a 2× magnification, using a 4f imaging system composed of a f=50 mm $CaF_2$ lens and a f=100 mm broadband achromat.

2. Rapid Chemically Selective 3D Imaging in the Mid-Infrared 2.1 Rapid MIR 3d Imaging The experimental setup for the MIR 3B imaging is schematically depicted in FIG. 11A. Two 100 fs pulse trains, a tunable MIR beam and a fixed 1200 nm (8333 $cm^{-1}$) NIR gate are spatially overlapped on the Si chip of a CCD camera. The MIR beam path passes onto the sample and the reflected/scattered light is collected by a 100 mm $CaF_2$ lens that projects an image of the sample onto the CCD in a 1:1 fashion (effective NA 0.015). An NTA signal is generated in the Si chip whenever the MIR temporally overlaps with the NIR gate pulse. The temporal gate, determined by the cross-correlation of the pulses, selectively registers MIR light that has traveled a pre-set path length. This allows depth-dependent detection of reflected/scattered light off the illuminated sample interface. In this wide-field imaging geometry, the acquisition of a full 3D scan requires a single axis scan of the time delay. In principle, this strategy enables 3D imaging with volumetric acquisition rates limited only by the frame rate of the CCD camera.

Figure 11B:
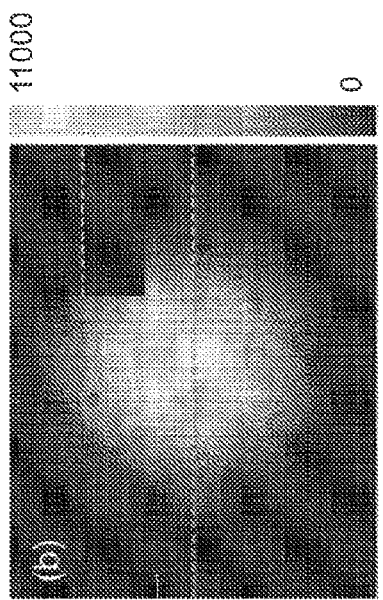
FIGS. 11A, 11B, and 11C. (A) Schematic representation of setup. (B) Beam image on CCD Si chip with MIR (2850 cm$^{-1}$, 3500 nm) and gate NIR pulses (8333 cm$^{-1}$, 1200 nm). Inset shows gate pulse only image at the same scale. (C) Spatial cross-section of beam image on CCD Si chip with and without MIR pulse. Inset: temporal cross-correlation of MIR and gate pulse, indicating a 110 fs pulse width (gray line—Gaussian fit).

FIG. 11B shows an image of the MIR beam profile (2850 cm$^{-1}$, 3500 nm) acquired through NTA. Compared to previous reports based on picosecond pulses [54], the increased irradiance of femtosecond pulses used here enables more efficient NTA detection. The intensity ratio between the MIR and the gate pulse can be flexibly chosen to raise the NTA signal relative to the degenerate two-photon absorption (DTA) background induced by the gate pulse [41, 36, 54, 63]. This is highlighted in the inset of FIG. 11B, which shows the DTA background signal when the Si chip is exposed only to the gate pulse. The NTA to DTA background signal is 34 dB (standard deviation ~2%, 100 ms per frame) at the center of the beam profile, with a ratio up to 40 dB towards the wings of the intensity distribution. The high signal to background ratio permits imaging without modulation/demodulation techniques, beam profile/intensity pre-characterization or post-processing of the images.

Figure 11C:
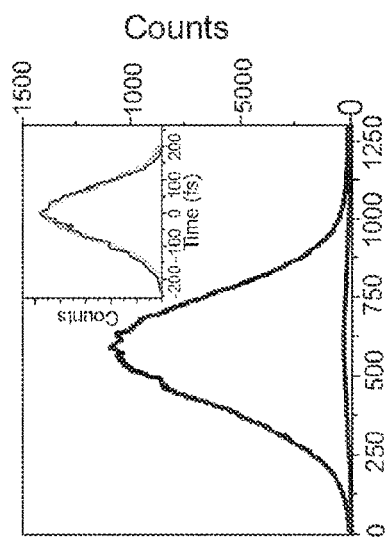
Figure 11A:
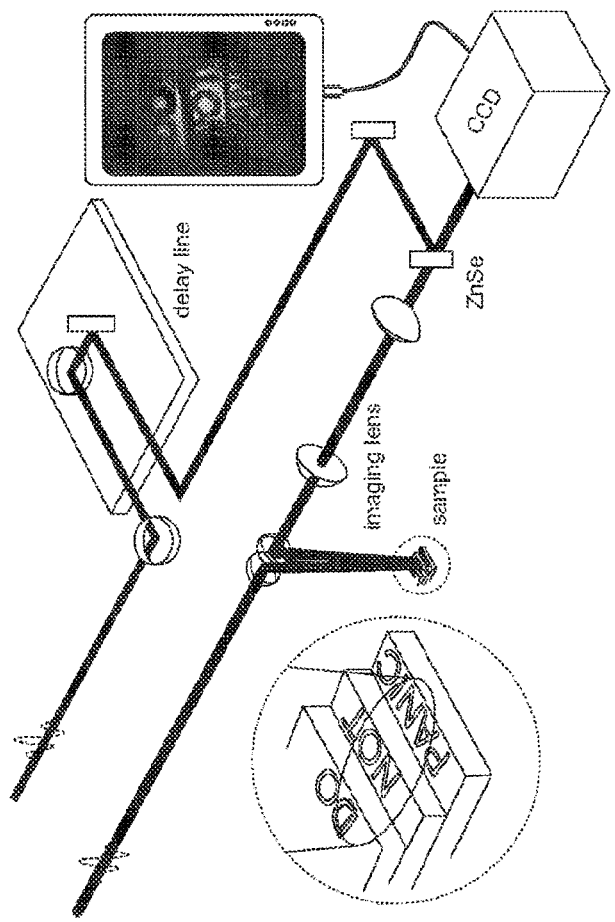

Other than in MIR OCT, where the axial resolution is determined by the spectral width of the light source via interferometric gating, in NTA tomographic imaging, the resolution is determined by the temporal cross-correlation of the MIR and gate pulses. The inset of FIG. 11C shows the cross-correlation of pulses at the camera chip, indicating a MIR pulse width of ~110 fs (FWHM) assuming a Gaussian pulse shape. This temporal pulse width corresponds to an axial resolution of ~15 μm (FWHM) or 12.7 μm (1/2e2) in vacuum. Note that the axial resolution is much higher than the resolution set by the Rayleigh range of the imaging system for the MIR beam (NA=0.015, $z_R$>3 mm), and is comparable to the confocal resolution offered by a NA >0.65 lens.

Figures 12A, 12B, 12C:
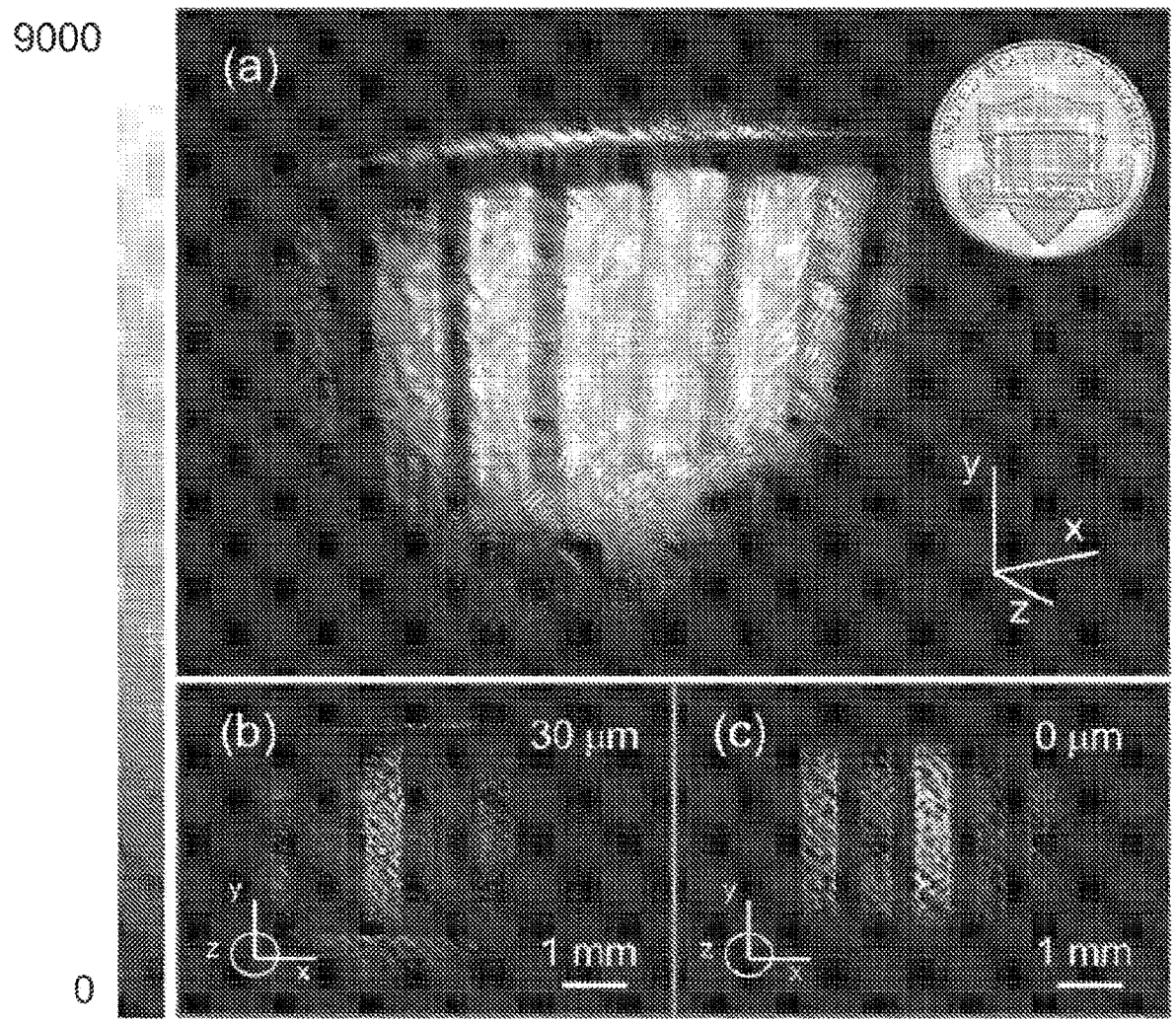
FIGS. 12A, 12B, 12C, 12D, 12E, and 12F. (A, B, C) Tomographic imaging of the structured metal surface of a one-cent US coin (Union Shield). (A) 3D reconstruction, (B) and (C) are frames measured at height h=30 μm and h=0 μm, respectively. (D, E, F) Tomographic imaging of stacked cellulose acetate sheets, a weakly reflecting polymer structure. (D) 3D reconstruction, (E) and (F) are 2D frames taken at the top of each sheet (Δh=105 μm). Total 3D scan time is 1 second.
Figures 12D, 12E, 12F:
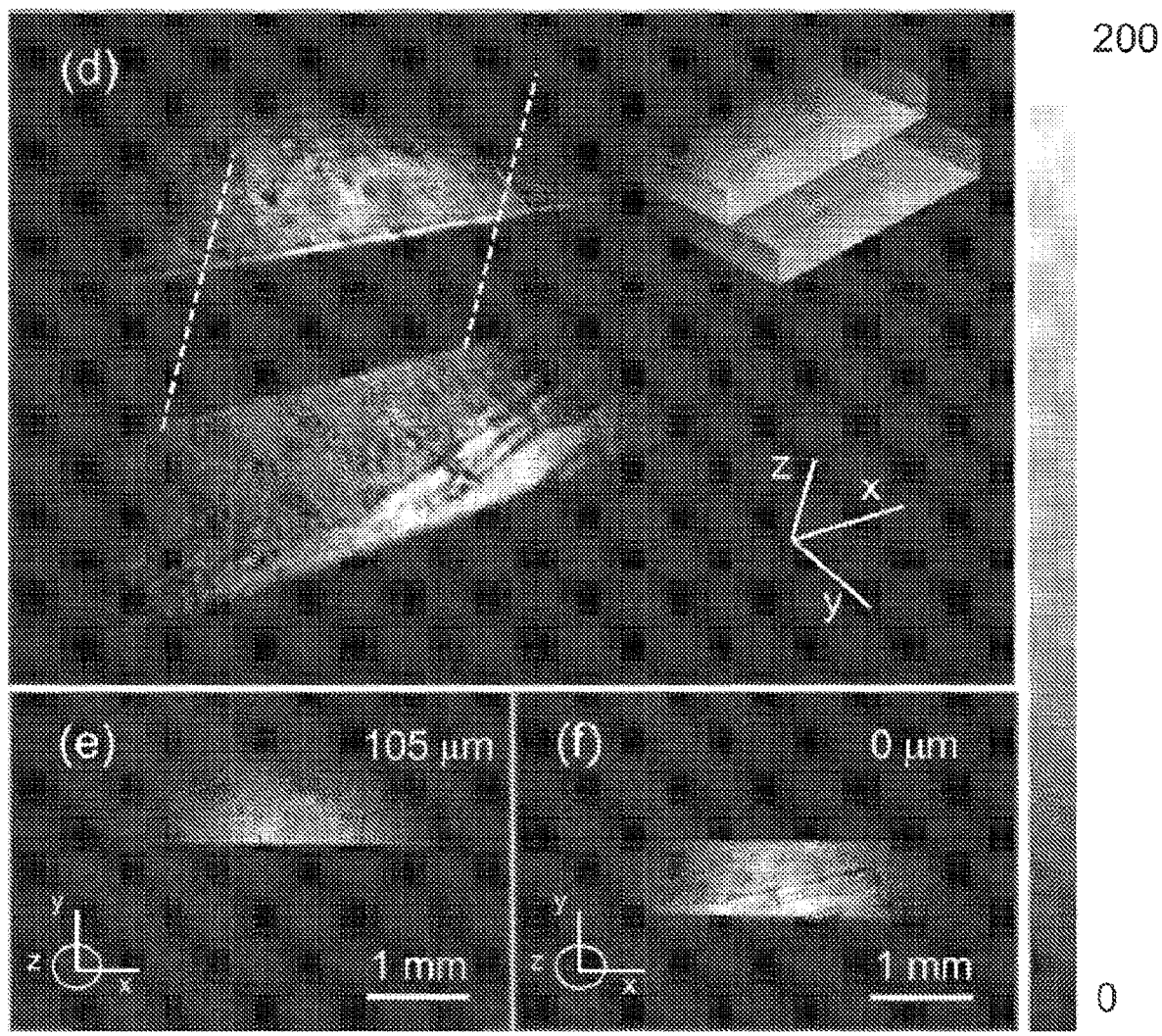

2D imaging is performed to illustrate the image quality of the technique. A live recording of *Tetramorium caespitum* (pavement ant) moving freely on a glass microscope slide was captured. At the low MIR illumination levels of 1 mW/cm2, the ant is active and appears unaffected by the radiation. It is interesting to observe that the chitin exoskeleton of the legs appears darker when the MIR is tuned to 2850 cm$^{-1}$, while it appears semi-transparent when tuned to 2450 cm$^{-1}$. The different contrast reflects the differences in MIR absorption of chitin, a polysaccharide-rich in $CH_2$ groups. The 3D imaging capabilities of the wide-field NTA method were studied by controlling the time delay between the MIR and NIR pulses. FIG. 12A depicts a 3D image of a one-cent US coin. This reconstruction is comprised of individual 2D wide-field images acquired at 100 ms/frame using 10 steps along the axial dimension, corresponding to a ~75 μm sample height and an effective total acquisition time of 1 s. Two optical slices of the data stack are shown in FIGS. 12B and 12B, depicting the rectangular pillars of the Union Shield at different heights. The axial difference between these 2D layers is 30 μm, which corroborates the height of the structures as revealed with confocal microscopy.

Whereas reflection/scattering off metal/air interfaces allows high contrast imaging, FIG. 12C shows that NTA-enabled detection also permits tomographic imaging of materials with a refractive index much closer to that of air. For this purpose, a polymer structure is used, consisting of a two-step ladder comprised of two 100 μm thick cellulose acetate sheets. The image reveals a ~105 μm step size of the ladder, which closely matches the actual sheet thickness. The small difference between these values is attributed to flatness variations of the sheets, causing slight variations in the step size.

2.2 3D Imaging Through Transparent and Highly Absorbing Media

Figure 13A:
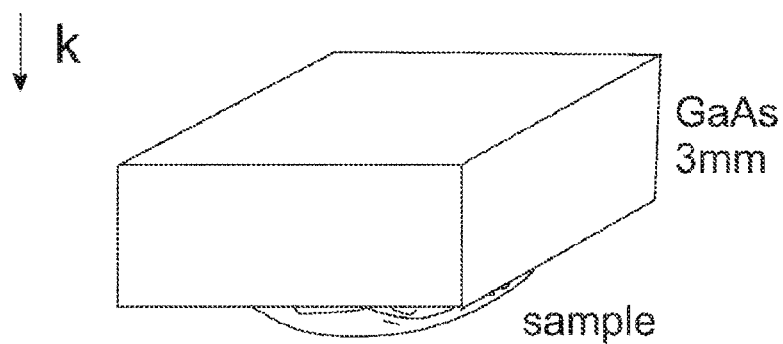
FIGS. 13A, 13B, 13C, 13D, 13E, and 13F. Sketch of penetration experiment arrangement through (a) 3 mm-thick GaAs wafer and 190 µm water layer. (b) 3D reconstruction of one cent US coin (Union Shield) through 3 mm GaAs wafer. (c) Tomographic imaging of stacked cellulose acetate sheets through 3 mm GaAs wafer. Imaging of one cent US coin (Union Shield) through 190 µm water layer (380 µm in the double pass) at (e) 2850 $cm^{-1}$ and (f) 2600 $cm^{-1}$.
Figure 13D:
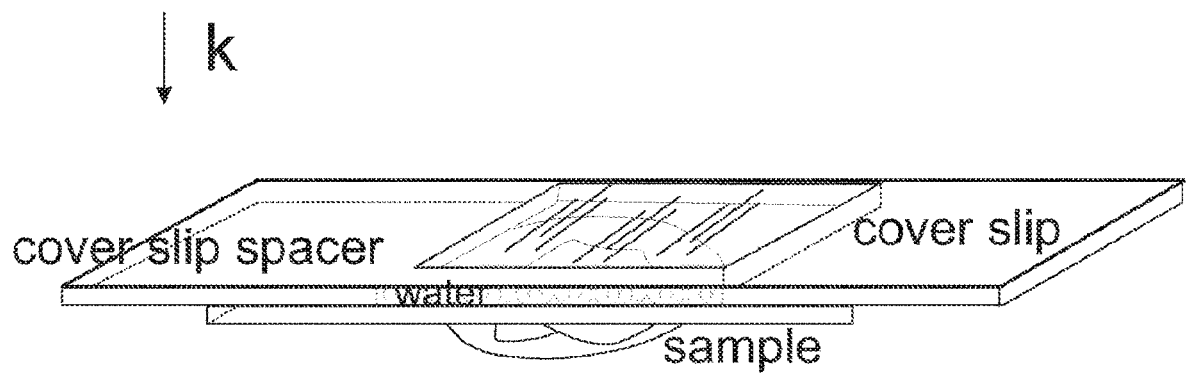
Figures 13B, 13C:
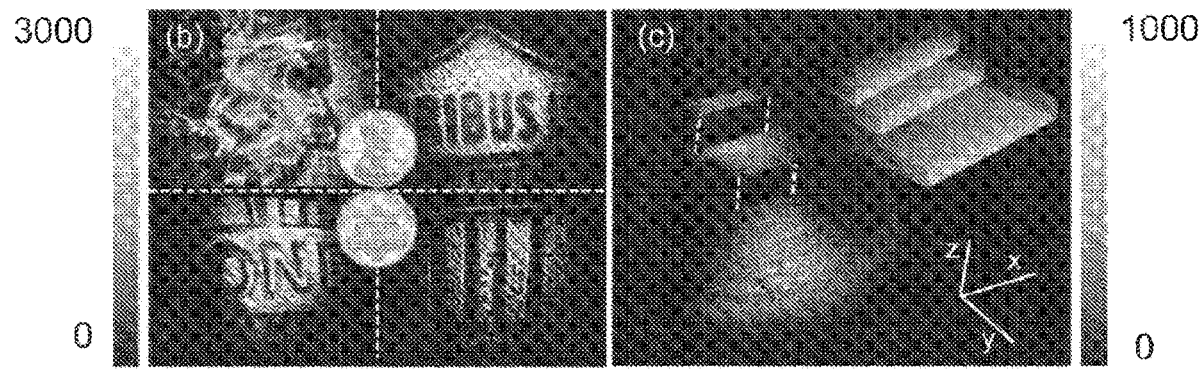
Figures 13E, 13F:
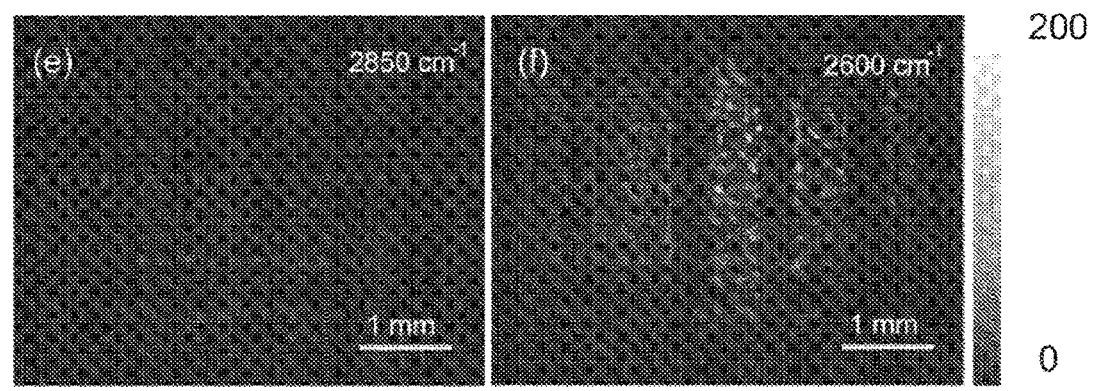

Compared to tomographic imaging in the visible range, MIR-based tomography benefits from reduced light scattering in various solids, permitting imaging through thicker materials. To illustrate this point, tomographic imaging of a coin hidden behind a 3 mm GaAs wafer is performed, shown schematically in FIG. 13A. Although GaAs shows minimal absorption at the 2850 cm$^{-1}$ energy of the MIR pulse, reflection at the wafer's top and bottom surfaces reduces the overall transmission of MIR light by 75% in the double-pass configuration, FIG. 13B shows that, despite these losses, tomographic images of the coin's features can still be clearly distinguished. Moreover, the weak reflection off a three-step cellulose acetate ladder provides sufficient back-scattered light for collecting a 3D image, depicted in FIG. 13C, even though it is covered by a visibly opaque material of high refractive index. The detection sensitivity afforded by fs-NTA on the CCD camera also enables detection of objects placed under strongly absorbing materials. In FIG. 13D, the coin is covered with a 190 μm layer of deionized water. Water displays a strong MIR absorption due to the OH-stretching modes, which peaks in the 3000-3500 cm$^{-1}$ range, with broad wings that extend to lower energies beyond 2600 cm$^{-1}$. In FIG. 13E, the coin is visualized when the MIR energy is set to 2850 cm$^{-1}$, showing low signal due to the strong water absorption. At this setting, a double pass through the water layer amounts to a MIR intensity loss of OD>4. When tuned to 2650 cm$^{-1}$, however, a two-dimensional image of the coin surface can be observed under the water at a 100 ms exposure time, despite a MIR transmission loss of OD>2. Here, the much lower signal levels necessitate subtraction of the DTA background (~200 counts), yet the results underline that fs-NTA detection is sensitive enough to retrieve MIR images even in the presence of thick water layers.

2.3 Chemical-Sensitive Tomographic Imaging

Figure 14A:
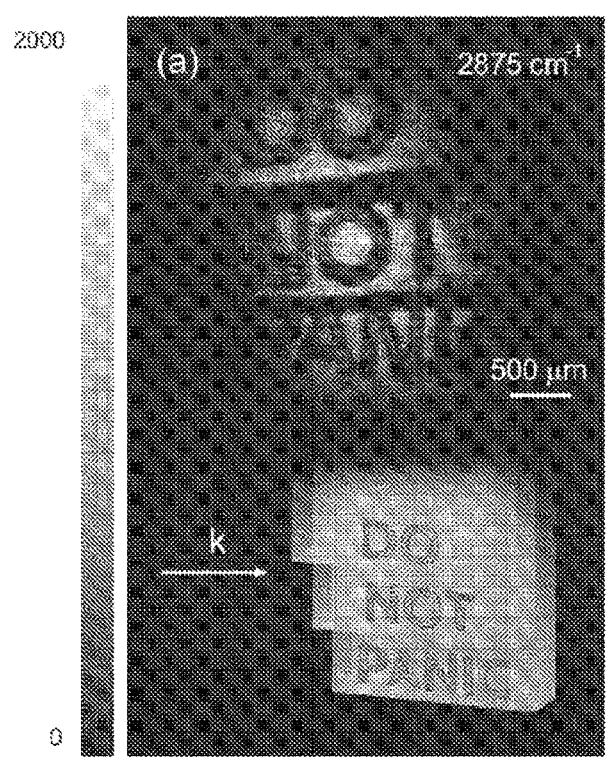
FIGS. 14A, 14B, 14C, 14D, 14E, and 14F. 3D imaging of stacked cellulose acetate sheets with printed letters. (A) 3D reconstruction of the structure. (B) FTIR transmission spectrum of cellulose acetate. Rectangles represent Gaussian pulse width of ~150 $cm^{-1}$. (C) and (D) 3D imaging at 2875 $cm^{-1}$, (E) and (F) 3D imaging at 2600 $cm^{-1}$. Total image acquisition time is 1 s.
Figure 14B:
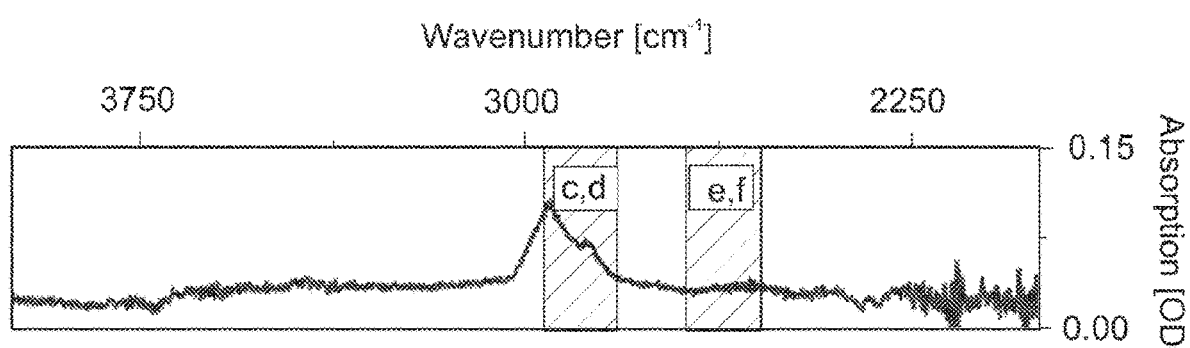
Figure 14C:
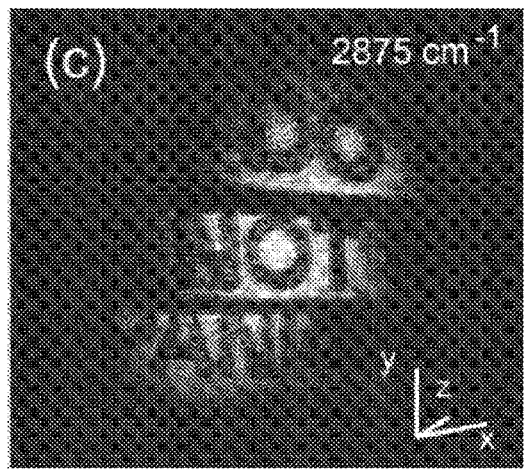
Figure 14E:
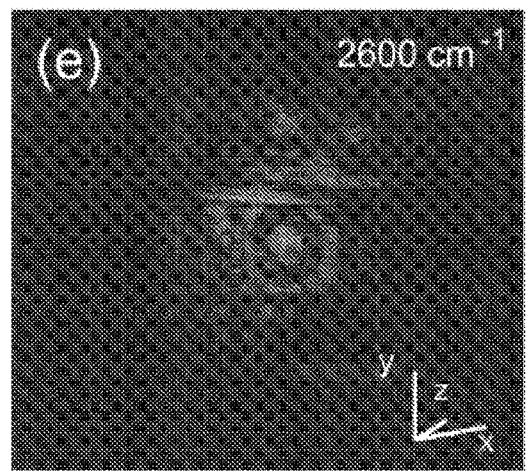
Figure 14D:
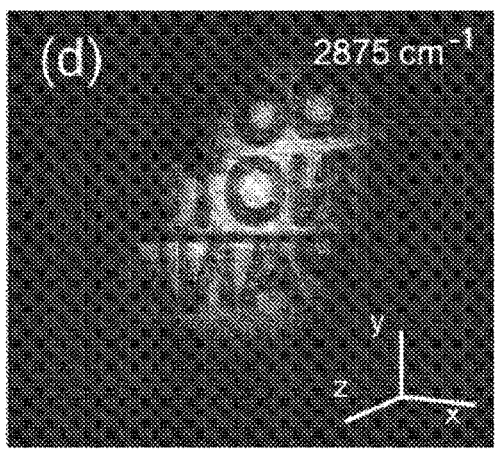
Figure 14F:
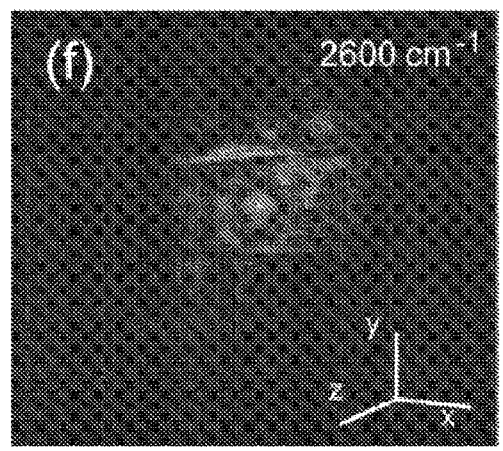

One of the most promising aspects of MIR tomographic imaging is the possibility to generate chemically selective images of 3D objects. Using fs-NTA detection, we illustrate this principle by producing 3D images of the cellulose acetate ladder at different vibrational energies, shown in FIG. 14A. To enhance contrast, letters have been printed on each layer using black ink. The FTIR spectrum of cellulose acetate is plotted in FIG. 14B. Strong reflection off cellulose acetate is expected when tuning to the red side of the CH-stretching vibration, where the real part of the complex refractive index displays a local maximum. When tuning to 2875 cm$^{-1}$, near the peak of the CH-stretching band, a bright tomographic image is obtained, as illustrated by the two projections in FIGS. 14C and 14D. At lower energies away from the resonance, the refractive index is expected to decrease, resulting in reduced reflection off the interface of the cellulose acetate material. This is indeed observed in FIGS. 14E and 14F, where the 3D image acquired at 2600 cm$^{-1}$ is now significantly less bright compared to the near-resonance condition at 2875 cm$^{-1}$. The reduced reflection at 2600 cm$^{-1}$ enhances light penetration in the sample, which allows collection of signal contributions from lower lying interfaces. Signals from the buried interfaces are clearly observed in the off-resonance condition. Since the optical path length is determined by the refractive index of the material, the apparent depth of the buried interfaces differs from that of the corresponding air-exposed interfaces. From this time/optical path difference, it is estimated that the refractive index of cellulose acetate to be 1.5 at 2600 cm$^{-1}$, resulting in a 4% Fresnel reflection at the sheet/air interface.

Figure 15A:
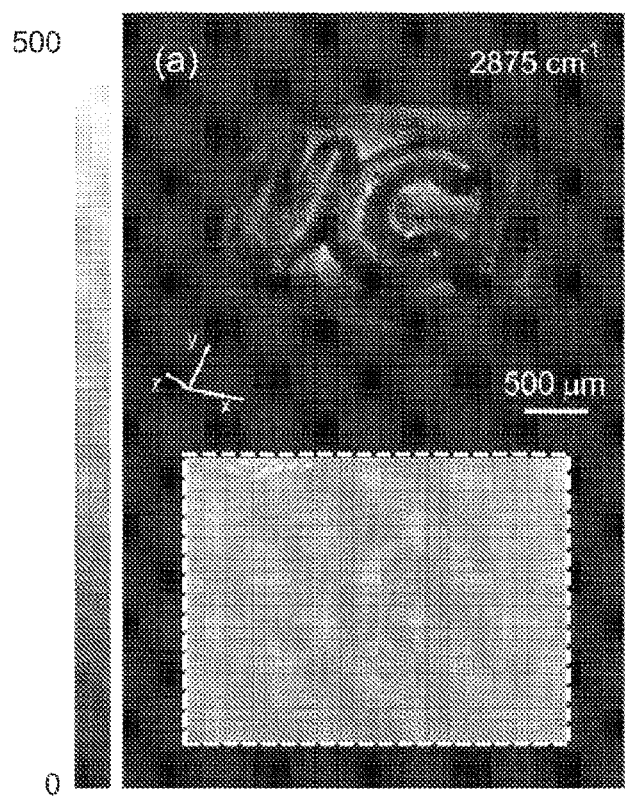
FIGS. 15A, 15B, 15C, 15D, 15E, and 15F. 3D imaging of a resin structure manufactured through projection-based photolithography technique. (A) 3D reconstruction of resin structure. (B) FTIR absorption spectrum of the resin. Rectangles represent Gaussian pulse width of ~150 $cm^{-1}$. (C) and (D) 3D imaging at 2775 $cm^{-1}$, and (E) and (F) 3D imaging at 2450 $cm^{-1}$. Structure height is ~50 µm. Total image acquisition time is 1 s.
Figure 15B:
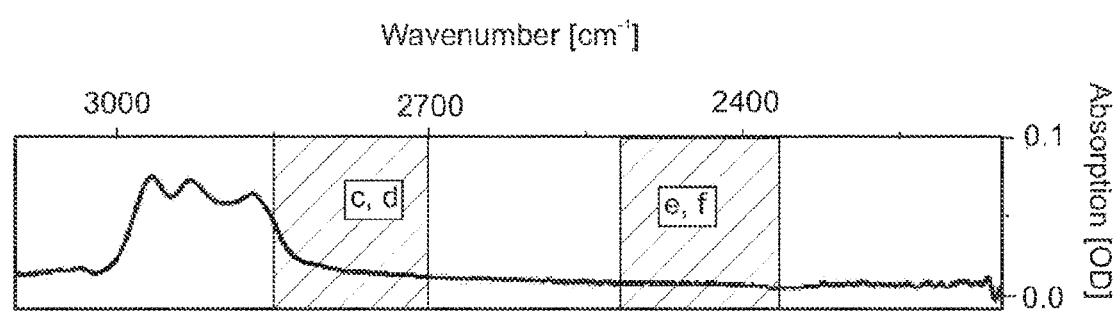
Figure 15C:
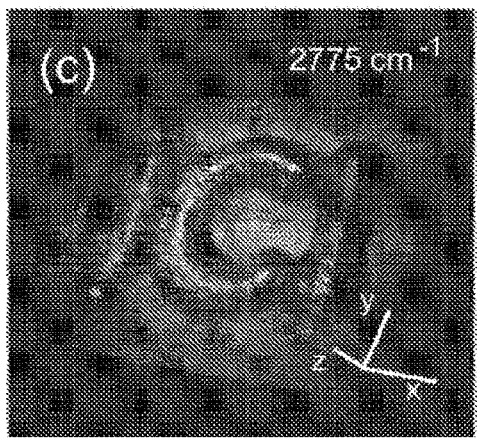
Figure 15D:
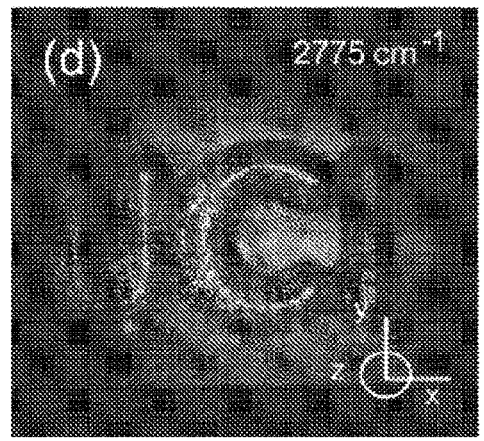
Figure 15E:
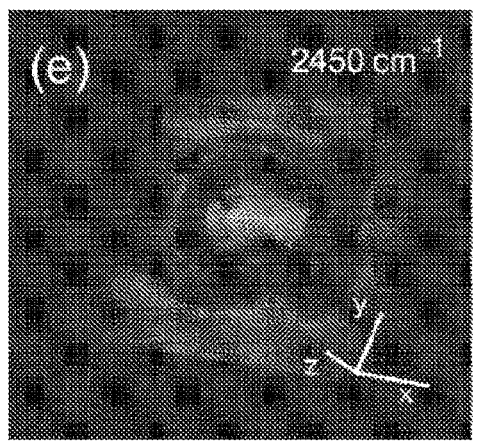
Figure 15F:
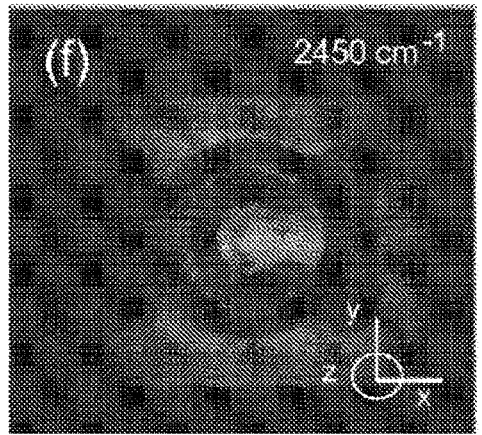

3D images of polymer structures fabricated with a projection-based photolithography technique (see Methods) are shown next. A visible image of the structure is shown in the inset of FIG. 15A, and the relevant part of the FTIR spectrum of the polymer is given in FIG. 15B. Increased signals are observed from the structure's top surface when the MIR energy is tuned into near-resonance with the material's CH-stretching vibrational mode (FIGS. 15C and 15D), and lower signals when the MIR energy is tuned of off-resonance (FIGS. 15E and 15F). Due to the shape of the structure, significant light scattering occurs at angles beyond the collection NA of the imaging system, producing darker regions at curved surfaces.

Figure 16A:
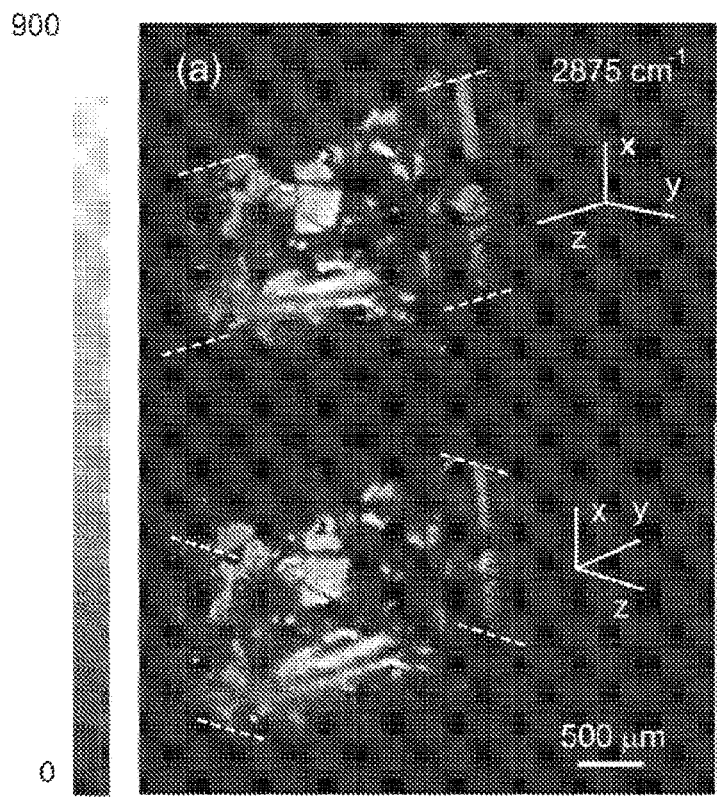
FIGS. 16A, 16B, 16C, 16D, 16E and 16F. Imaging of different lysozyme crystals on mica glass. (A) 3D reconstruction of lysozyme crystal cluster at 2875 $cm^{-1}$. (B) 3D reconstruction of single crystal. 2D image of the crystal's top face taken at (C) 2875 $cm^{-1}$, (D) 2600 $cm^{-1}$ and (F) 2450 $cm^1$. (E) FTIR absorption spectrum of lysozyme.
Figure 16B:
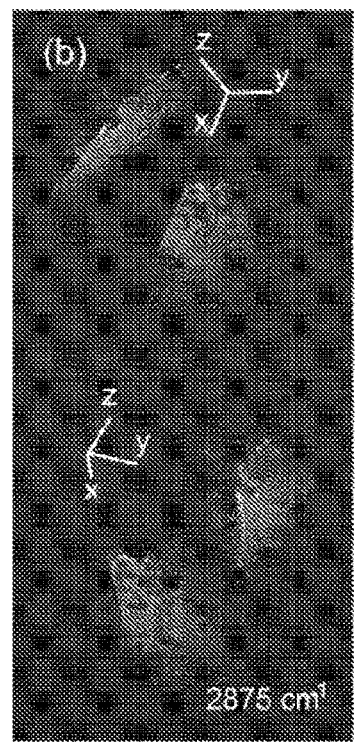
Figure 16C:
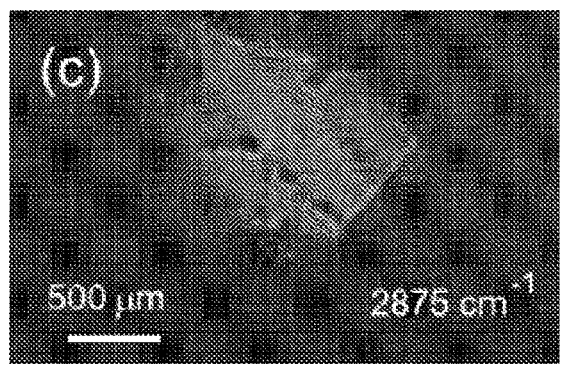
Figure 16D:
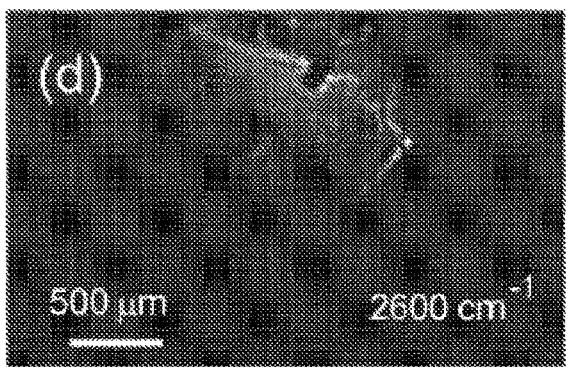
Figure 16E:
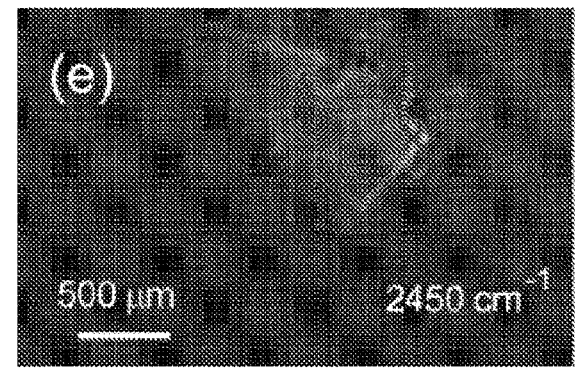
Figure 16F:
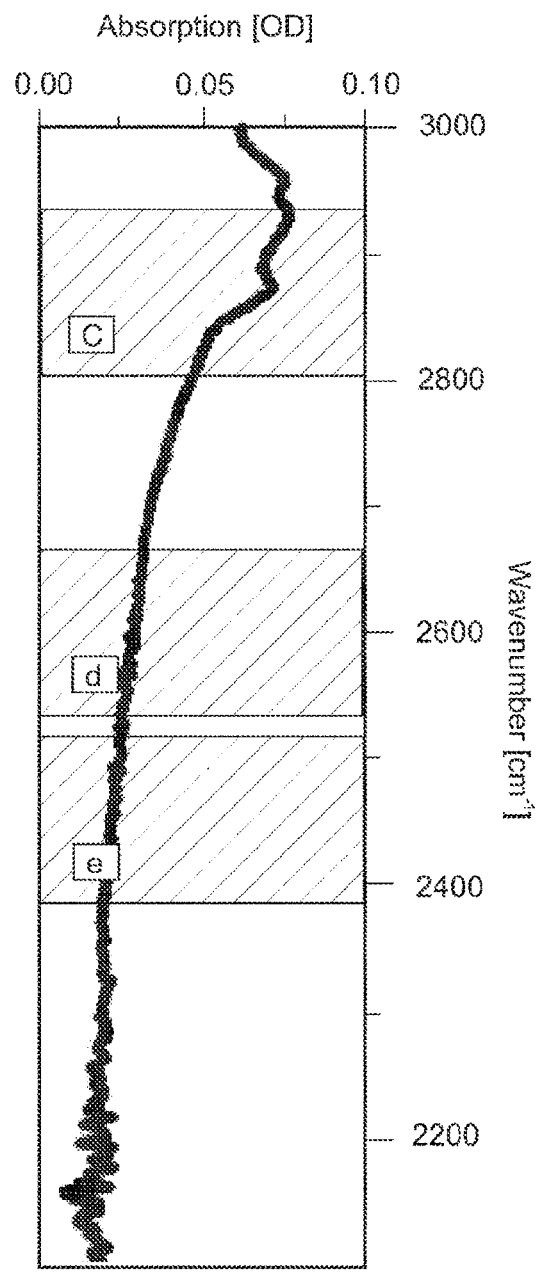

Last, MIR tomography of a hydrated protein crystal is performed. In FIG. 16, a 3D reconstruction of lysozyme crystals is shown. The lysozyme enzyme forms stable tetragonal crystals that can grow to millimeter scales. The structure visualized in FIG. 16A is composed of an aggregate of smaller crystals, while FIG. 16B shows a 3D image of a single crystal. The spectral dependence of the signal from a single surface is presented in FIGS. 16C, 16D, and 16E, confirming the chemical contrast encoded in the MIR light scattered onto the detector.

2.4 Discussion

In the 3D imaging experiments, wide-field fs-NTA detection in Si cameras for enabling high-definition MIR tomographic imaging at high acquisition rates is discussed. The technology is fundamentally different from existing OCT techniques that operate in the MIR. The most promising MIR-OCT approaches are currently based on Fourier-domain OCT (FD-OCT)[67, 68], which accomplishes depth scans (A-scan) or cross-sectional scans (B-scans) on a time scale set by the spectral acquisition time of the detector. This detection strategy has been successfully translated to MIR-OCT using both classical[68] or quantum [58] light, with A-scans acquired in just under 10 ms. However, in combination with lateral raster scanning, such imaging conditions translate into rather long total volume acquisition times of minutes/volume, extended further in duration by necessary referencing and post-processing In contrast, volumetric imaging through fs-NTA uses different mechanisms for capturing information along the lateral and axial dimensions. First, fs-NTA uses a wide-field detection approach, which allows detection of both lateral dimensions in a single shot. The massively parallel detection enabled by Mpx camera chips provides a dramatic gain of the effective acquisition rate. An off-the-shelf CCD camera has been used, with an effective readout time of 10 Hz. However, by using modern sCMOS cameras, which feature higher quantum yields and faster readout times, the image acquisition time can easily be improved with another two orders of magnitude. Second, the axial information in fs-NTA tomography is retrieved through a scan of the time delay between the MIR and the gate pulses. Scanning along this dimension can be accomplished with automated translation stages over 1 mm distances, with 1.5 μm (6 fs) repeatability and 2 ms response times. Hence, the total 3D acquisition time is limited primarily by the 2D image acquisition time of the camera. Although the experiments set forth above achieve a total effective acquisition time of 1 s (10 frames/s, 10 axial steps) for the 3D data stack, it is evident that the selection of a better camera would allow for volumetric imaging at much higher rates.

Compared to spectral interferometry approaches, volumetric imaging with fs-NTA is significantly more robust. First, it is not vulnerable to spectral shifts associated with small temperature changes of external nonlinear media, which may require the recurring acquisition of multiple reference spectra [58, 69]. Second, in contrast to up-conversion techniques, fs-NTA mapping avoids the practical complication of phase-matching between the MIR and up-conversion pulses within the nonlinear medium [30, 35, 57]. Wide-field fs-NTA requires no DTA-background subtraction nor multiple processing steps to retrieve the MIR signal. Instead, 2D images are acquired in single shot mode, allowing rapid and unimpeded axial scans for collecting 3D data stacks. For our current imaging conditions, the signal-to-noise ratio (SNR) of each frame is 72 dB for a 100 ms integration time, determined by using a gold mirror as the sample. The NTA to DTA background ratio is 34 dB, which is sufficiently high for enabling imaging under virtually background-free conditions.

It is shown that MIR tomographic imaging enabled by fs-NTA exhibits chemical contrast based on the vibrational resonances of the sample. Although the spectral resolution is limited by the bandwidth of the MIR pulse (<150 cm$^{-1}$), the spectroscopic contrast imparted by the sample's vibrational modes is clearly observed. It is non-trivial to achieve similar contrast with conventional FD-OCT methods, where spectroscopic imprints are difficult to retrieve in the presence of the strong interferometric modulations of the detected spectrum. Therefore, although MIR-OCT is recognized for its greater penetration depth, chemically selective imaging has remained a challenge. As our experiments show, chemical contrast appears rather naturally when the fs-NTA detection approach is used.

Finally, it is noted that the current experiments utilize a light source based on a low repetition rate amplified laser system. Such amplified pulses, however, are not a prerequisite for the demonstrated imaging capabilities. It is shown above that a detection sensitivity of only few fJ/pulse per pixel can be achieved with ps pulses derived from a high repetition rate picosecond light source. Similar experiments with shorter femtosecond pulses will require only few aJ of MIR radiation on single-camera pixel. Emerging developments in ultrafast fiber-based lasers promise to provide such high repetition rate fs pulses, underlining the potential of rapid fs-NTA tomography with affordable and compact light sources.

2.5 Methods 2.5.1 Fourier Transform Infrared Spectroscopy

MIR absorption of materials is measured with a commercial FTIR spectrometer (Jasco 4700) either in transmission mode or by using an ATR accessory equipped with a diamond crystal.

2.5.2 MIR Fs-NTA Imaging System

The imaging system is schematically depicted in FIG. 11A and described above. A 1 kHz amplified femtosecond laser system (Spitfire Ace, Spectra Physics) is used to seed two optical parametric amplifiers (Topas Prime, Light Conversion). One OPA is used as a source of NIR gate radiation at 1200 nm. The signal and idler pulses from the second OPA system are used in to generate MIR pulses through the process of difference-frequency generation in a nonlinear medium. Both MIR and NIR pulses are re-combined on a 1 mm ZnSe window, which serves as a dichroic mirror, after which the pulses are overlapped on a CCD camera (DR-328G-CO2-SIL Clara, Andor). The temporal overlap is controlled through a mechanical delay stage (GTS150, Newport). The MIR imaging system consist of two 100 mm $CaF_2$ lenses, resulting in a 1:1 imaging system with NA=0.015. The incident angle of the MIR beam on the sample is less than 5 degrees, resulting in an error for z-height determination of less than a percent.

2.5.3 Polymer Structure Fabrication

The computer-aided design models of the structures (SolidWorks) are virtually sliced into 2D layers with a slice thickness of 20 μm. Mask projection images are generated for each layer [70]. The exposure time of each layer is adjusted based on the light intensity and the photosensitivity of the printing material (ranging from 5 s to 8 s) to improve the fabrication accuracy. The UV-curing photopolymer resin from Elegoo Inc. is used for structure fabrication due to its desired IR property. The resin is used directly without modification.

In the projection-based stereolithography process, the photocurable resin is deposited on the surface of a transparent resin tank. To generate the 2D patterned light beam, 405 nm wavelength light is reflected by a digital micromirror device (DMD) comprised of a 1920×1080 array of micromirrors, and the brightness of each pixel in the projected light beam is controlled by adjusting the angle of the corresponding micromirror in the DMD.

2.5.4 Confocal Imaging of Coin Structure

The 3D-images are acquired with a Leica SP8 Dive microscope operated in the reflectance confocal imaging mode using a 532 nm light source and a 10×, 0.3 NA objective. The images are acquired as z-stacks of mosaics (adjacent field-of-views stitched together). The area of each en-face mosaic frame is 13.5×9.3 mm, the distance between the frames in the z-stack is 5 μm.

2.5.5 Lysozyme Crystals Growing and Handling

Hen egg-white lysozyme is purchased from Fisher Scientific (ICN19530325). The lyophilized powder is dissolved to 20 mg/mL in 100 mM sodium acetate pH 4.5. Batch crystallization is performed with the lysozyme solution in a 1:1 ratio with 1 M NaCl in 100 mM sodium acetate pH 4.5.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] Bhargava, R. Infrared Spectroscopic Imaging: The Next Generation. Applied Spectroscopy 66, 1091-1120 (2012).
[2] Wetzel, D. L. & LeVine, S. M. Imaging Molecular Chemistry with Infrared Microscopy. Science 285, 1224 (1999).
[3] Wrobel, T. P. & Bhargava, R. Infrared Spectroscopic Imaging Advances as an Analytical Technology for Biomedical Sciences. Analytical Chemistry 90, 1444-1463 (2018).
[4] Su, R., Kirillin, M., Chang, E. W., Sergeeva, E., Yun, S. H. & Mattsson, L. Perspectives of mid-infrared optical coherence tomography for inspection and micrometrology of industrial ceramics. Optics Express 22, 15804-15819 (2014).
[5] Wang, Y., Wang, Y. & Le, H. Q. Multi-spectral mid-infrared laser stand-off imaging. Optics Express 13, 6572-6586 (2005).
[6] van der Meer, F. D., van der Werff, H. M. A., van Ruitenbeek, F. J. A., Hecker, C. A., Bakker, W. H., Noomen, M. F., van der Meijde, M., Carranza, E. J. M., Smeth, J. B. d. & Woldai, T. Multi- and hyperspectral geologic remote sensing: A review. International Journal of Applied Earth Observation and Geoinformation 14, 112-128 (2012).
[7] Chen, Y., Zou, C., Mastalerz, M., Hu, S., Gasaway, C. & Tao, X. Applications of Micro-Fourier Transform Infrared Spectroscopy (FTIR) in the Geological Sciences—A Review. International Journal of Molecular Sciences 16 (2015).
[8] Mintenig, S. M., Int-Veen, I., Löder, M. G. J., Primpke, S. & Gerdts, G. Identification of microplastic in effluents of waste water treatment plants using focal plane array-based micro-Fourier-transform infrared imaging. Water Research 108, 365-372 (2017).
[9] C. S. Cheung, J. M. O. Daniel, M. Tokurakawa, W. A. Clarkson, and H. Liang, High resolution fourier domain optical coherence tomography in the 2 μm wavelength range using a broadband supercontinuum source, Opt. Express 23, 1992 (2015).
[10] C. S. Colley, J. C. Hebden, D. T. Delpy, A. D. Cambrey, R. A. Brown, E. A. Zibik, W. H. Ng, L. R. Wilson, and J. W. Cockburn, Mid-infrared optical coherence tomography, Review of Scientific Instruments 78, 123108 (2007).
[11] N. Guilhaumou, P. Dumas, G. L. Carr, and G. P. Williams, Synchrotron infrared microspec-trometry applied to petrography in micrometer-scale range: Fluid chemical analysis and map-ping, Appl. Spectrosc. 52, 1029 (1998).
[12] S. Ishida and N. Nishizawa, Quantitative comparison of contrast and imaging depth of ultrahigh-resolution optical coherence tomography images in 800-1700 nm wavelength region, Biomed. Opt. Express 3, 282 (2012).
[13] F. Jamme, B. Lagarde, A. Giuliani, G. A. Garcia, and L. Mercury, Synchrotron infrared con-focal microscope: Application to infrared 3d spectral imaging, Journal of Physics: Conference Series 425, 142002 (2013).
[14] M. Martin, C. Dabat-Blondeau, M. Unger, J. Sedlmair, D. Y. Parkinson, H. A. Bechtel, B. Ill-man, J. M. Castroa, M. Keiluweit, D. Buschke, B. Ogle, M. J. Nasse, and C. J. Hirschmugl, 3d spectral imaging with synchrotron fourier transform infrared spectro-microtomography, Nature Methods 10, 861 (2013).
[15] U. Sharma, E. W. Chang, and S. H. Yun, Long-wavelength optical coherence tomography at 1.7 μm for enhanced imaging depth, Opt. Express 16, 19712 (2008).
[16] I. Zorin, P. Gattinger, M. Brandstetter, and B. Heise, Dual-band infrared optical coherence tomography using a single supercontinuum source, Opt. Express 28, 7858 (2020).
[17] I. Zorin, R. Su, A. Prylepa, J. Kilgus, M. Brandstetter, and B. Heise, Mid-infrared fourier-domain optical coherence tomography with a pyroelectric linear array, Opt. Express 26, 33428 (2018).
[18] Yeh, K., Kenkel, S., Liu, J.-N. & Bhargava, R. Fast Infrared Chemical Imaging with a Quantum Cascade Laser. Analytical Chemistry 87, 485-493 (2015).
[19] Borondics, F., Jossent, M., Sandt, C., Lavoute, L., Gaponov, D., Hideur, A., Dumas, P. & Février, S. Supercontinuum-based Fourier transform infrared spectromicroscopy. Optica 5, 378-381 (2018).
[20] Kilgus, J., Langer, G., Duswald, K., Zimmerleiter, R., Zorin, I., Berer, T. & Brandstetter, M. Diffraction limited mid-infrared reflectance microspectroscopy with a supercontinuum laser. Optics Express 26, 30644-30654 (2018).
[21] Rogalski, A. Infrared detectors: an overview. Infrared Physics & Technology 43, 187-210 (2002).
[22] Lemos, G. B., Borish, V., Cole, G. D., Ramelow, S., Lapkiewicz, R. & Zeilinger, A. Quantum imaging with undetected photons. Nature 512, 409-412 (2014).
[23] Lee, E. S. & Lee, J. Y. High resolution cellular imaging with nonlinear optical infrared microscopy. Optics Express 19, 1378-1384 (2011).
[24] Zhang, D., Li, C., Zhang, C., Slipchenko, M. N., Eakins, G. & Cheng, J.-X. Depth-resolved mid-infrared photothernial imaging of living cells and organisms with submicrometer spatial resolution. Science Advances 2 (2016).
[25] Samolis, P. D. & Sander, M. Y. Phase-sensitive lock-in detection for high-contrast mid-infrared photothermal imaging with sub-diffraction limited resolution. Optics Express 27, 2643-2655 (2019).
[26] Bai, Y., Zhang, D., Lan, L., Huang, Y., Maize, K., Shakouri, A. & Cheng, J.-X. Ultrafast chemical imaging by wide-field photothermal sensing of infrared absorption. Science Advances 5, eaav7127 (2019).
[27] Schnell, M., Mittal, S., Falahkheirkhah, K., Mittal, A., Yeh, K., Kenkel, S., Kajdacsy-Balla, A., Carney, P. S. & Bhargava, R. All-digital histopathology by infrared-optical hybrid microscopy. Proceedings of the National Academy of Sciences 117, 3388 (2020).
[28] Johnson, T. A. & Diddams, S. A. Mid-infrared upconversion spectroscopy based on a Yb:fiber femtosecond laser. Applied Physics B 107, 31-39 (2012).
[29] Tidemand-Lichtenberg, P., Dam, J. S., Andersen, H. V., Høgstedt, L. & Pedersen, C. Mid-infrared upconversion spectroscopy. Journal of the Optical Society of America B 33, D28-D35 (2016).
[30] Junaid, S., Tomko, J., Semtsiv, M. P., Kischkat, J., Masselink, W. T., Pedersen, C. & Tidemand-Lichtenberg, P. Mid-infrared upconversion based hyperspectral imaging. Optics Express 26, 2203-2211 (2018).
[31] Gu, X., Huang, K., Li, Y., Pan, H., Wu, E. & Zeng, H. Temporal and spectral control of single-photon frequency upconversion for pulsed radiation. Applied Physics Letters 96, 131111 (2010).
[32] Thew, R. T., Zbinden, H. & Gisin, N. Tunable upconversion photon detector. Applied Physics Letters 93, 071104 (2008).
[33] Watson, E. A. & Morris, G. M. Comparison of infrared upconversion methods for photon-limited imaging. Journal of Applied Physics 67, 6075-6084 (1990).
[34] Barh, A., Rodrigo, P. J., Meng, L., Pedersen, C. & Tidemand-Lichtenberg, P. Parametric upconversion imaging and its applications. Adv. Opt. Photon. 11, 952-1019 (2019).
[35] Junaid, S., Chaitanya Kumar, S., Mathez, M., Hermes, M., Stone, N., Shepherd, N., Ebrahim-Zadeh, M., Tidemand-Lichtenberg, P. & Pedersen, C. Video-rate, mid-infrared hyperspectral upconversion imaging. Optica 6, 702-708 (2019).
[36] Fishman, D. A., Cirloganu, C. M., Webster, S., Padilha, L. A., Monroe, M., Hagan, D. J. & Van Stryland, E. W. Sensitive mid-infrared detection in wide-bandgap semiconductors using extreme nondegenerate two-photon absorption. Nature Photonics 5, 561-565 (2011).
[37] Hayat, A., Ginzburg, P. & Orenstein, M. Infrared single-photon detection by two-photon absorption in silicon. Physical Review B 77, 125219 (2008).
[38] Pattanaik, H. S., Reichert, M., Hagan, D. J. & Van Stryland, E. W. Three-dimensional IR imaging with uncooled GaN photodiodes using nondegenerate two-photon absorption. Optics Express 24, 1196-1205 (2016).
[39] Pattanaik, H. S., Vol. Ph.D. (University of Central Florida, CREOL, 2015).
[40] Cirloganu, C. M., Vol. Ph.D. (University of Central Florida, CREOL, 2010).
[41] Cirloganu, C. M., Padilha, L. A., Fishman, D. A., Webster, S., Hagan, D. J. & Van Stryland, E. W. Extremely nondegenerate two-photon absorption in direct-gap semiconductors [Invited]. Optics Express 19, 22951-22960 (2011).
[42] Hutchings, D. C. & Van Stryland, E. W. Nondegenerate two-photon absorption in zinc blende semiconductors. Journal of the Optical Society of America B 9, 2065-2074 (1992).
[43] Sheik-Bahae, M., Wang, J., DeSalvo, R., Hagan, D. J. & Van Stryland, E. W. Measurement of nondegenerate nonlinearities using a two-color Z scan. Optics Letters 17, 258-260
[44] Wherrett, B. S. Scaling rules for multiphoton interband absorption in semiconductors. Journal of the Optical Society of America B 1, 67-72 (1984).
[45] Sheik-Bahae, M., Hutchings, D. C., Hagan, D. J. & Stryland, E. W. V. Dispersion of bound electron nonlinear refraction in solids. IEEE Journal of Quantum Electronics 27, 1296-1309 (1991).
[46] Dinu, M. Dispersion of phonon-assisted non-resonant third-order nonlinearities. IEEE Journal of Quantum Electronics 39, 1498-1503 (2003).
[47] Garcia, H. & Kalyanaraman, R. Phonon-assisted two-photon absorption in the presence of a dc-field: the nonlinear Franz-Keldysh effect in indirect gap semiconductors. Journal of Physics B: Atomic, Molecular and Optical Physics 39, 2737-2746 (2006).
[48] Bristow A. D., R. N., van Driel H. M. Two-photon absorption and Kerr coefficients of silicon fro 850-2200 nm. Applied Physics Letters 90, 191104 (2007).
[49] Zhang, Y., Husko, C., Lefrancois, S., Rey, I. H., Krauss, T. F., Schroder, J. & Eggleton, B. J. Nondegenerate two-photon absorption in silicon waveguides: analytical and experimental study. Optics Express 23, 17101-17110 (2015).
[50] Poulvellarie, N., Ciret, C., Kuyken, B., Leo, F. & Gorza, S.-P. Highly Nondegenerate Two-Photon Absorption in Silicon Wire Waveguides. Physical Review Applied 10, 024033 (2018).
[51] Cox, N., Hagan, D. & Van Stryland, E. Extremely nondegenerate two-photon absorption in silicon (Conference Presentation), Vol. 10916. (SPIE, 2019).
[52] I. Kviatkovsky, H. M. Chrzanowski, E. G. Avery, H. Bartolomaeus, and S. Ramelow, Mi-croscopy with undetected photons in the mid-infrared, Science Advances 6 (2020).
[53] A. V. Paterova, S. M. Maniam, H. Yang, G. Grenci, and L. A. Krivitsky, Hyperspectral infrared microscopy with visible light, Science Advances 6 (2020).
[54] D. Knez, A. M. Hanninen, R. C. Prince, E. O. Potma, and D. A. Fishman, Infrared chem-ical imaging through nondegenerate two-photon absorption in silicon-based cameras, Light: Science & Applications 9, 125 (2020).

[55] A. M. Hanninen and E. O. Potma, Nonlinear optical microscopy with achromatic lenses ex-tending from the visible to the mid-infrared, APL Photonics 4, 080801 (2019).
[56] A. M. Hanninen, R. C. Prince, R. Ramos, M. V. Plikus, and E. O. Potma, High-resolution infrared imaging of biological samples with third-order sum-frequency generation microscopy, Biomed. Opt. Express 9, 4807 (2018).
[57] N. M. Israelsen, C. R. Petersen, A. Barh, D. Jain, M. Jensen, G. Hannesschl"ager, P. Tidemand-Lichtenberg, C. Pedersen, A. Podoleanu, and O. Bang, Real-time high-resolution mid-infrared optical coherence tomography, Light: Science & Applications 8, 11 (2019).
[58] A. Vanselow, P. Kaufmann, I. Zorin, B. Heise, H. M. Chrzanowski, and S. Ramelow, Frequency-domain optical coherence tomography with undetected mid-infrared photons, Optica 7, 1729 (2020).
[59] A. Rojas-Santana, G. J. Machado, D. Lopez-Mago, and J. P. Torres, Frequency-correlation requirements on the biphoton wave function in an induced-coherence experiment between separate sources, Phys. Rev. A 102, 053711 (2020).
[60] G. J. Machado, G. Frascella, J. P. Torres, and M. V. Chekhova, Optical coherence tomography with a nonlinear interferometer in the high parametric gain regime, Applied Physics Letters 117, 094002 (2020).
[61] A. V. Paterova, H. Yang, C. An, D. A. Kalashnikov, and L. A. Krivitsky, Tunable optical coherence tomography in the infrared range using visible photons, Quantum Science and Technology 3, 025008 (2018).
[62] A. Vall'es, G. Jim'enez, L. J. Salazar-Serrano, and J. P. Torres, Optical sectioning in induced coherence tomography with frequency-entangled photons, Phys. Rev. A 97,
[63] J. Fang, Y. Wang, M. Yan, E. Wu, K. Huang, and H. Zeng, Highly sensitive detection of infrared photons by nondegenerate two-photon absorption under midinfrared pumping, Phys. Rev. Applied 14, 064035 (2020).
[64] Pattanaik, H. S., Vol. Ph.D. (University of Central Florida, CREOL, 2015).
[65] Wallace, V. M., Dhumal, N. R., Zehentbauer, F. M., Kim, H. J. & Kiefer, J. Revisiting the Aqueous Solutions of Dimethyl Sulfoxide by Spectroscopy in the Mid- and Near-Infrared: Experiments and Car-Parrinello Simulations. The Journal of Physical Chemistry B 119, 14780-14789 (2015).
[66] T. Klein and R. Huber, High-speed oct light sources and systems, Biomed. Opt. Express 8, 828 (2017).
[67] M. A. Choma, M. V. Sarunic, C. Yang, and J. A. Izatt, Sensitivity advantage of swept source and fourier domain optical coherence tomography, Opt. Express 11, 2183 (2003).
[68] I. Zorin, R. Su, A. Prylepa, J. Kilgus, M. Brandstetter, and B. Heise, Mid-infrared fourier-domain optical coherence tomography with a pyroelectric linear array, Opt. Express 26, 33428 (2018).
[69] M. Wojtkowski, V. J. Srinivasan, T. H. Ko, J. G. Fujimoto, A. Kowalczyk, and J. S. Duker, Ultrahigh-resolution, high-speed, fourier domain optical coherence tomography and methods for dispersion compensation, Opt. Express 12, 2404 (2004).
[70] C. Zhou, Y. Chen, and R. A. Waltz, Optimized mask image projection for solid freeform fabrication, J. Manuf. Sci. Eng. 131, 061004 (2009).

What is claimed is:
1. An imaging system comprising:
a sample holder for positioning a target sample to be imaged;
a camera including an array or matrix of imaging elements, each imaging element including a semiconductor having a direct or indirect bandgap energy, the camera configured to provide image data to a device for displaying an image of the target sample;
a first photon source of pulsed or continuous wave radiation that provides pumping photons at a near-infrared wavelength;
a second photon source of pulsed or continuous wave radiation that provides mid-infrared photons at a mid-infrared wavelength;
a first optical system for directing the mid-infrared photons on to the target sample;
an imaging component for directing the mid-infrared photons from the target sample to the camera; and
a second optical system for directing the pumping photons,
wherein the mid-infrared photons and the pumping photons are directed onto the array or matrix of imaging elements such that the mid-infrared photons and the pumping photons are spatially and temporally overlapping on each imaging element of the array or matrix, the sum of photon energy for each temporally and spatially overlapping mid-infrared photon and pumping photon being greater than or equal to the direct or indirect bandgap energy.
2. The imaging system of claim 1 wherein the mid-infrared photons have peak intensities less than 50 W/cm$^2$.
3. The imaging system of claim 1 wherein the first photon source provides mid-infrared photon pulses and the second photon source provides pumping photon pulses.
4. The imaging system of claim 3, wherein the mid-infrared photon pulses and the pumping photon pulses each independently have a repetition rate from about 10 Hz to 150 MHz.
5. The imaging system of claim 3, wherein the first photon source and the second photon source each independently provide light pulses having a time duration of 35 femtoseconds to 10 milliseconds.
6. The imaging system of claim 1, wherein the mid-infrared wavelength is from 2000 nm to 20000 nm, and the near-infrared wavelength is from 700 nm to 3000 nm.
7. The imaging system of claim 1 further comprising a computing device configured to display the image.
8. The imaging system of claim 7, wherein the computing device is further configured to subtract a background from the image.
9. The imaging system of claim 8, wherein the background is measured only once for a given intensity of the pumping photons.
10. The imaging system of claim 1, wherein the mid-infrared wavelength is selected to be off-resonance to a vibration mode for a compound in the target sample.
11. The imaging system of claim 1, wherein the mid-infrared wavelength is selected to be on resonance to a vibration mode for a compound in the target sample.
12. The imaging system of claim 1, wherein the image is rendered in a single shot without phase-matching of mid-infrared and pumping photons in a nonlinear conversion medium and without a need for post-acquisition image reconstruction.
13. The imaging system of claim 1, wherein a photon energy ratio of each mid-infrared photon to pumping photon is greater than 0.3.

14. The imaging system of claim 1, wherein sample holder position the target sample such that mid-infrared photons transmit through the target sample for 2D imaging.

15. The imaging system of claim 1, wherein sample holder positions the target sample such that mid-infrared photons reflect off of or scatter from the target sample for 2D and/or 3D imaging.

16. The imaging system of claim 1 wherein the first optical system and/or the second optical system includes a photon delay line for adjusting a time delay between pumping photons and the mid-infrared photons to ensure temporal overlap.

17. The imaging system of claim 1 wherein the sample holder is motorized to allow automatic translation of the target sample.

18. A wide-field microscope comprising the imaging system of claim 1.

19. The wide-field microscope of claim 18 further comprising a microscope objective system, the microscope objective system including one or more optical components of the first optical system and/or the second optical system.

20. The wide-field microscope of claim 19 wherein the microscope objective system includes first Cassegrain objective and second Cassegrain objective.

21. An 3D imaging system comprising:
a sample holder for positioning a target sample to be imaged;
a camera including an array or matrix of imaging elements, each imaging element including a semiconductor having a direct or indirect bandgap energy, the camera configured to provide image data to a device for displaying an image of the target sample;
a first photon source of pulsed or continuous wave radiation that provides pumping photons at near-infrared wavelength;
a second photon source of pulsed or continuous wave radiation that provides mid-infrared photons at a mid-infrared wavelength having a peak intensities less than 50 W/cm$^2$;
a first optical system for directing the mid-infrared photons onto the target sample wherein the sample holder positions the target sample such that the mid-infrared photons reflect or scatter off the target sample;
an imaging component for directing the mid-infrared photons from the target sample to the camera;
a second optical system for directing the pumping photons; and
an optional photon delay line for adjusting a time delay between the pumping photons and the mid-infrared photons, the optional photon delay line allowing the time delay to be scanned, thereby allowing imaging of slices in the target sample, wherein the mid-infrared photons and the pumping photons are directed onto the array or matrix of imaging elements such that the mid-infrared photons and the pumping photons are spatially and temporally overlapping on each imaging element of the array or matrix, the sum of photon energy for each temporally and spatially overlapping mid-infrared photon and pumping photon being greater than or equal to the direct or indirect bandgap energy.

22. The 3D imaging system of claim 21, wherein the first photon source and the second photon source each independently provides light pulses having a time duration of 10 femtoseconds to 10 milliseconds.

23. The 3D imaging system of claim 21, wherein the mid-infrared wavelength is from 2000 nm to 20000 nm and the near-infrared wavelength is from 700 nm to 3000 nm.

24. The 3D imaging system of claim 21 further comprising a computing device configured to display the image.

25. The 3D imaging system of claim 21, wherein the mid-infrared wavelength is selected to be off-resonance to a vibration mode for a compound in the target sample.

26. The 3D imaging system of claim 21, wherein the mid-infrared wavelength is selected to be on resonance to a vibration mode for a compound in the target sample.

27. An imaging method comprising,
providing pulsed or continuous wave radiation including pumping photons at near-infrared wavelength;
providing pulsed or continuous wave radiation including mid-infrared photons at a mid-infrared wavelength having peak intensities less than 50 W/cm$^2$;
directing the mid-infrared photons on to a target sample;
spatially and temporally overlapping the mid-infrared photons with the pumping photons; and
directing the mid-infrared photons and the pumping photons onto a camera having an array or matrix of imaging elements, each imaging element including a semiconductor having a direct or indirect bandgap energy, wherein the sum of photon energy for each temporally and spatially overlapping mid-infrared photons and pumping photons is greater than or equal to the direct or indirect bandgap energy.

28. The imaging method of claim 27 wherein mid-infrared photon pulses and pumping photon pulses are provided.

29. The imaging method of claim 28, wherein the mid-infrared photon pulses and the pumping photon pulses each independently have time duration of 10 femtoseconds to 10 milliseconds.

30. The imaging method of claim 27, wherein the mid-infrared wavelength is from 2000 nm to 20000 nm and the near-infrared wavelength is from 700 nm to 3000 nm.

31. The imaging method of claim 27, wherein the mid-infrared wavelength is selected to be off-resonance to a vibration mode for a compound in the target sample.

32. The imaging method of claim 27, wherein the mid-infrared wavelength is selected to be on resonance to a vibration mode for a compound in the target sample.

33. The imaging method of claim 27, wherein the target sample is positioned such that the mid-infrared wavelength passes therethrough.

34. The imaging method of claim 27, wherein the target sample is positioned such that the mid-infrared wavelength reflects or scatters from the target sample.

35. The imaging method of claim 27 further comprising stepping through time delays between the pumping photons and the mid-infrared photons to sample slices of the target sample.

36. The imaging method of claim 35 further comprising reconstructing the slices to form a three-dimensional image of the target sample.

* * * * *